United States Patent
Laroia et al.

(10) Patent No.: US 8,705,438 B2
(45) Date of Patent: Apr. 22, 2014

(54) METHODS AND APPARATUS FOR SELECTING AND/OR USING A COMMUNICATIONS BAND FOR PEER TO PEER SIGNALING

(75) Inventors: Rajiv Laroia, Far Hills, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1242 days.

(21) Appl. No.: 11/775,778

(22) Filed: Jul. 10, 2007

(65) Prior Publication Data

US 2009/0016261 A1    Jan. 15, 2009

(51) Int. Cl.
*H04W 4/00* (2009.01)
*H04W 36/00* (2009.01)
*H04W 40/00* (2009.01)

(52) U.S. Cl.
USPC ............ 370/328; 455/443; 455/444; 455/448

(58) Field of Classification Search
CPC .................................................... H04W 88/06
USPC .................................................. 370/328, 338
See application file for complete search history.

(56) References Cited

U.S. PATENT DOCUMENTS

| | | | |
|---|---|---|---|
| 4,907,290 A | 3/1990 | Crompton | |
| 5,537,415 A | 7/1996 | Miller et al. | |
| 6,330,447 B1 | 12/2001 | Hengeveld | |
| 6,532,369 B1 | 3/2003 | Myer | |
| 7,027,827 B2* | 4/2006 | Bonta et al. | 455/502 |
| 7,069,026 B2 | 6/2006 | McClure | |
| 7,113,771 B2 | 9/2006 | Kotzin | |
| 7,292,824 B2 | 11/2007 | Yamaguchi et al. | |
| 7,899,073 B2 | 3/2011 | Laroia et al. | |
| 2005/0111383 A1* | 5/2005 | Grob et al. | 370/254 |
| 2005/0239451 A1 | 10/2005 | Periyalwar et al. | |
| 2006/0270422 A1 | 11/2006 | Benco et al. | |

(Continued)

FOREIGN PATENT DOCUMENTS

| | | |
|---|---|---|
| EP | 0292182 | 11/1988 |
| EP | 1079651 | 2/2001 |

(Continued)

OTHER PUBLICATIONS

International Search Report, PCT/US08/069104, International Search Authority, European Patent Office, Oct. 29, 2008.

(Continued)

*Primary Examiner* — Huy C Ho
(74) *Attorney, Agent, or Firm* — James K. O'Hare

(57) ABSTRACT

Methods and apparatus for supporting peer to peer communications are described. A plurality of wide area network communications bands in a wireless communications system are also available for use to communicate peer to peer signals. At different times it may be advantageous for a mobile peer to peer communications device to use a different communications band in order to efficiently share air link resources. A peer to peer communications device receives a signal transmitted by a WAN device, e.g., a base station or WAN wireless terminal, and selects a WAN communications band to use as a function of the received signal, e.g., a corresponding band. In some embodiments, the received signal strength measurements from WAN devices are used in the selection process. In other embodiments, recovered decoded information conveyed in a received WAN device signal is used in the selection process.

52 Claims, 18 Drawing Sheets

(56) References Cited

U.S. PATENT DOCUMENTS

| | | |
|---|---|---|
| 2007/0135041 A1 | 6/2007 | Sawada et al. |
| 2009/0016363 A1 | 1/2009 | Laroia et al. |
| 2009/0017838 A1 | 1/2009 | Laroia et al. |

FOREIGN PATENT DOCUMENTS

| | | |
|---|---|---|
| EP | 1427236 | 6/2004 |
| EP | 1455547 | 9/2004 |
| EP | 1788761 | 5/2007 |
| EP | 2023681 A1 | 2/2009 |
| GB | 2308946 | 7/1997 |
| JP | 63299532 A | 12/1988 |
| JP | 6085739 A | 3/1994 |
| JP | 2001086555 A | 3/2001 |
| JP | 2002208891 A | 7/2002 |
| JP | 2003153336 A | 5/2003 |
| JP | 2003249939 A | 9/2003 |
| JP | 2006287357 A | 10/2006 |
| JP | 2006526368 A | 11/2006 |
| JP | 2007503788 A | 2/2007 |
| JP | 2007088940 A | 4/2007 |
| JP | 2007512755 A | 5/2007 |
| JP | 2007512779 A | 5/2007 |
| JP | 2007165997 A | 6/2007 |
| JP | 2007166488 A | 6/2007 |
| JP | 2008510343 A | 4/2008 |
| WO | 2004105409 A1 | 12/2004 |
| WO | 2005053253 | 6/2005 |
| WO | 2005053343 A1 | 6/2005 |
| WO | 2006016330 A1 | 2/2006 |
| WO | 2007055993 A1 | 5/2007 |

OTHER PUBLICATIONS

Written Opinion, PCT/US08/069104, International Search Authority, European Patent Office, Oct. 29, 2008.

Katragadda S., et al., "A decentralized location-based channel access protocol for inter-vehicle communication." VTC 2003-Spring. The 57th. IEEE Semiannual Vehicular Technology Conference. Proceedings. Jeju, Korea, Apr. 22-25, 2003, vol. 3, Apr. 22, 20.

* cited by examiner

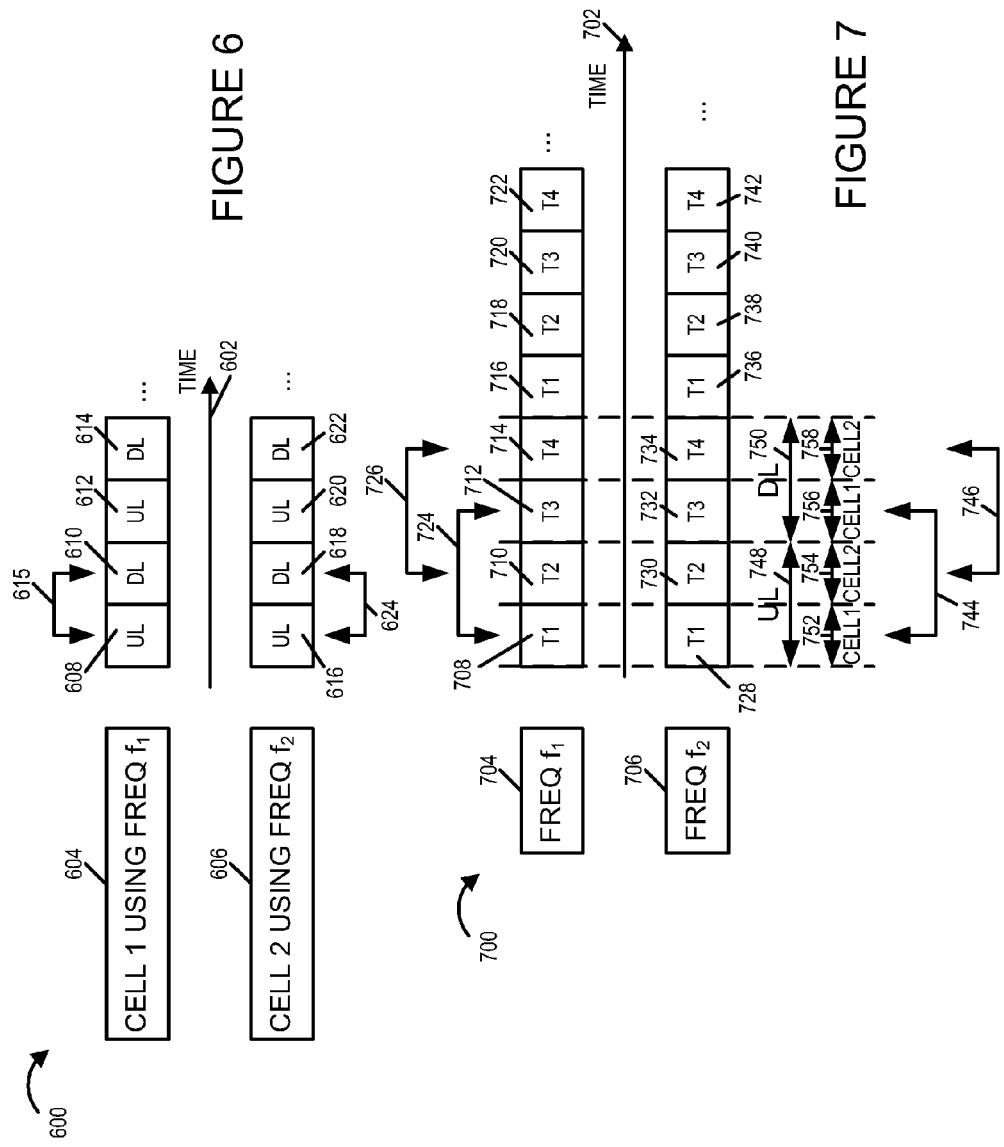

METHODS AND APPARATUS FOR SELECTING AND/OR USING A COMMUNICATIONS BAND FOR PEER TO PEER SIGNALING

FIELD

Various embodiments are directed to methods and apparatus for wireless communication and, more particularly, to methods and apparatus for use in peer to peer wireless communication.

BACKGROUND

Wide area network (WAN) wireless communications systems are typically allocated a set of air link resources for use in a region. In some regions a plurality of different alternative WAN communications bands are available. Allocated WAN air link resources can be, and sometimes are underutilized by the WAN signaling requirements at a given location and/or time. It would be advantageous if methods and apparatus were developed which allowed WAN air link resources to be shared to support other communications techniques, e.g., peer to peer signaling. It would be beneficial if methods and apparatus were developed which facilitated intelligent selection between alternative possible WAN air link resources which could be used for peer to peer signaling, e.g., a selection which takes into consideration interference considerations at a WAN receiver and/or a peer to peer receiver.

SUMMARY

Methods and apparatus for supporting peer to peer communications are described. A plurality of wide area network communications bands in a wireless communications system are also available for use to communicate peer to peer signals. At different times it may be advantageous for a mobile peer to peer communications device to use a different communications band in order to efficiently share air link resources. A peer to peer communications device receives a signal transmitted by a WAN device, e.g., a base station or WAN wireless terminal, and selects a WAN communications band to use as a function of the received signal. In some embodiments, the received signal strength of signals from WAN devices are measured and the measured signal strength is used in the selection process. In other embodiments, recovered decoded information conveyed in a received WAN device signal is used in the selection process.

Various alternative band selection implementations take into consideration impact to the WAN ongoing signaling recovery from peer to peer signaling sharing a bandwidth and/or interference considerations from the perspective of the peer to peer communications device. In some exemplary embodiments the peer to peer communications device measures signal strengths of received base station downlink signals communicated via a plurality of different downlink communications bands and selects a corresponding uplink band to use for peer to peer signaling as a function of the measured signals. For example, the peer to peer communications device may detect beacon signals or other WAN base station broadcast signals in a plurality of downlink WAN bands, identifies the weakest received signal, and selects the corresponding WAN uplink band to the downlink band which conveyed the weakest signal for use in communicating peer to peer communication signals. In some embodiments the peer to peer communications device measures signal strengths of received WAN wireless terminal signals communicated via a plurality of uplink bands, and selects a corresponding downlink communications band to use as a function of the measured signals.

Various features are relevant to embodiments in which peer to peer signaling shares bandwidth with frequency division duplex (FDD) communications bands while other features are relevant to embodiments in which peer to peer signaling shares bandwidth with time division duplex (TDD) communications bands. Accordingly, it should be appreciated that not all features are used in all embodiments.

An exemplary method of operating a communications device, in accordance with various embodiments, comprises: receiving a signal from a wide area network communications device, said signal having been transmitted by the wide area network (WAN) device in one of a plurality of WAN communications bands; and selecting one of said WAN communications bands for peer to peer communications based on the received signal. An exemplary wireless terminal in accordance with various embodiments comprises: a receiver for receiving a signal from a wide area network communications device, said signal having been transmitted by the WAN device in one of a plurality of WAN communications bands; and a peer to peer communications band selection module for selecting one of said WAN communications bands for peer to peer communications based on the received signal.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 6 is a drawing illustrating exemplary communications bands in a time division duplex (TDD) system where different cells using different TDD duplex bands, and wherein at least some of air link resources are shared between WAN and peer to peer communications.

FIG. 7 is a drawing illustrating exemplary communications bands in a time division duplex system where different cells use the same TDD bands but at different times, and wherein at least some of air link resources are shared between WAN and peer to peer communications.

DETAILED DESCRIPTION

Figure 1:
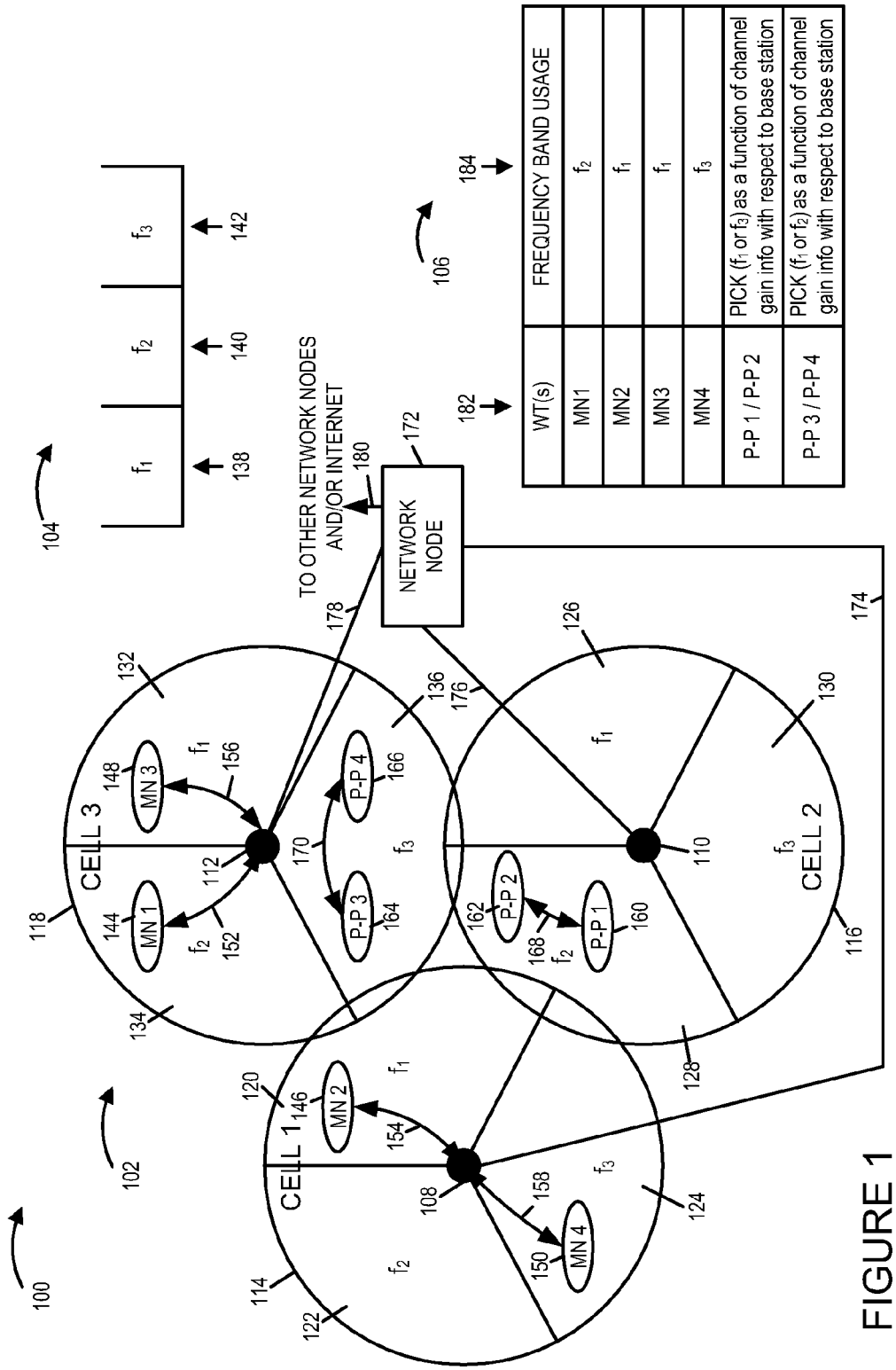
FIG. 1 is a drawing of an exemplary wireless communications system, an exemplary frequency spectrum partition, and a table identifying exemplary current wireless terminal frequency band usage.

FIG. 1 is a drawing 100 of an exemplary wireless communications system 102, an exemplary frequency spectrum partition 104, and a table 106 identifying exemplary current wireless terminal frequency band usage. Exemplary wireless communications system 102 supports both WAN communications, wherein a wireless terminal communicates via a base station attachment point with another wireless terminal in the system, and peer to peer communications, wherein a wireless terminal communicates with another wireless terminal without using a base station as a point of network attachment.

Exemplary wireless communications system 102 includes a plurality of base stations (base station 1 108, base station 2 110, base station 3 112) with corresponding cellular coverage areas (cell 1 114, cell 2 116, cell 3 118), respectively. In this example, the base stations are multi-sector base stations, e.g., 3 sector base stations. Cell 1 114 includes a first sector 120, a second sector 122, and a third sector 124. Cell 2 116 includes a first sector 126, a second sector 128, and a third sector 130. Cell 3 118 includes a first sector 132, a second sector 134, and a third sector 136. In this system there is partial overlap between at least some of the sectors.

Frequency spectrum partition drawing 104 includes a first frequency band $f_1$ 138, a second frequency band $f_2$ 140, and a third frequency band $f_3$ 142. In some embodiments, the frequency bands (138, 140, 142) are downlink frequency bands. In some embodiments the frequency bands (138, 140, 142) are uplink frequency bands. In some embodiments a frequency band, e.g., frequency band $f_1$ 138, is used for both uplink and downlink in a TDD manner. In some embodiments a frequency band, e.g., frequency band $f_1$ 138, includes a FDD portion used for uplink and a FDD portion used for downlink. First frequency band $f_1$ 138 is used for WAN signaling in first sectors (120, 126, 132) of cells (114, 116, 118), respectively. Second frequency band $f_2$ 140 is used for WAN signaling in second sectors (122, 128, 134) of cells (114, 116, 118), respectively. Third frequency band $f_3$ 142 is used for WAN signaling in third sectors (124, 130, 136) of cells (114, 116, 118), respectively.

The base stations (108, 110, 112) are coupled together and to other network nodes and/or the Internet via a backhaul. Exemplary system 102 includes network node 172 which is coupled to base stations (108, 110, 112) via network links (174, 176, 178), respectively. Network node 172 is also coupled to other networks nodes, e.g., other base stations, AAA nodes, home agent node, etc., and/or the Internet via network link 180. Network links (174, 176, 178, 180) are, e.g., fiber optic links.

Exemplary communications system 102 includes a plurality of wide area network wireless terminals (MN 1 144, MN 2 146, MN 3 148, and MN 4 150). MN 1 144 is coupled to a sector 2 base station 3 attachment point via wireless link 152. MN 2 146 is coupled to a sector 1 base station 1 attachment point via wireless link 154. MN 3 148 is coupled to a sector 1 base station 3 attachment point via wireless link 156. MN 4 150 is coupled to a sector 3 base station 1 attachment point via wireless link 158. MN 1 144 is, e.g., participating in a communications session with MN 2 146. MN 3 148 is, e.g., participating in a communications session with MN 4 150.

Exemplary wireless communications system 102 also includes a plurality of peer to peer wireless terminals (peer-peer wireless terminal 1 160, peer-peer wireless terminal 2 162, peer to peer wireless terminal 3 164, peer to peer wireless terminal 4 166). In this example, peer-peer device 1 160 is communicating in a peer to peer communications session with peer-peer device 2 162 over wireless link 168, and both peer to peer devices (160, 162) are located in sector 2 128 of cell 2 116. In this example, peer-peer device 3 164 is communicating in a peer to peer communications session with peer-peer device 4 166 over wireless link 170, and both peer to peer devices (164, 166) are located in sector 3 136 of cell 3 118.

Table 106 identifies exemplary current wireless terminal frequency band usage. First column 182 identifies the wireless terminal and second column 184 identifies the corresponding frequency band usage. MN 1 144 currently uses frequency band $f_2$. MN 2 146 currently uses frequency band $f_1$. MN 3 148 currently uses frequency band $f_1$. MN 4 150 currently uses frequency band $f_3$. Peer to peer wireless terminal 1 160 and peer to peer wireless terminal 2 162 are currently using one of frequency band $f_1$ and frequency band $f_3$. The selection of the frequency band, e.g., the selection of which one of $f_1$ band and $f_3$ band to use for peer to peer signaling, having been picked as a function of channel gain information with respect to the base stations. Peer to peer wireless terminal 3 164 and peer to peer wireless terminal 4 166 are currently using one of frequency band $f_1$ and frequency band $f_2$. The selection of the frequency band, e.g., the selection of which one of $f_1$ band and $f_2$ band to use for peer to peer signaling, having been picked as a function of channel gain information with respect to the base stations.

Figure 2:
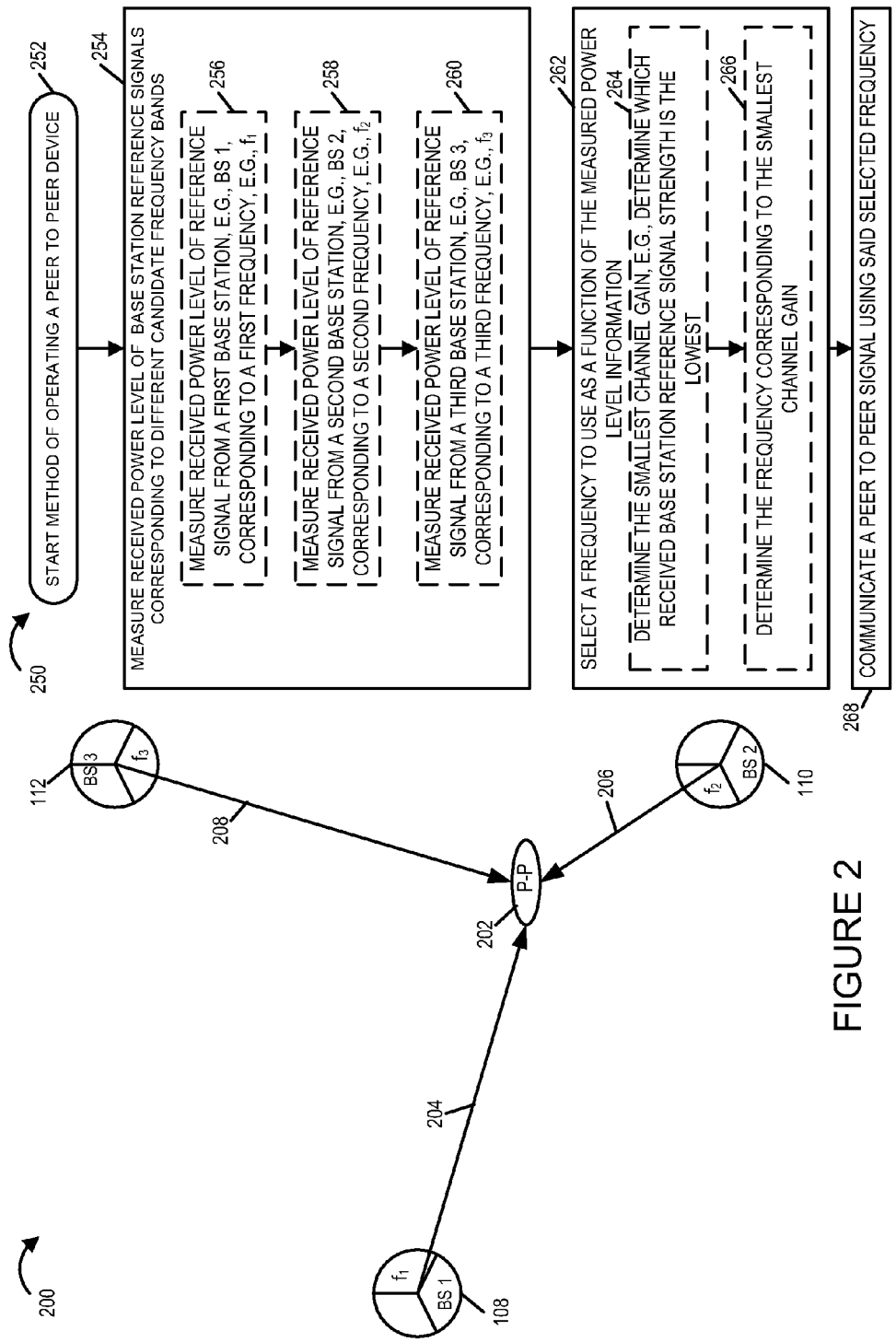
FIG. 2 is a drawing including a plurality of sectorized base stations transmitting reference signals, and an exemplary peer to peer wireless terminal which receives and measures those reference signals.

FIG. 2 is a drawing 200 including a plurality of sectorized base stations (108, 110, 112) transmitting reference signals (204, 206, 208), respectively, and an exemplary peer to peer wireless terminal 202 which receives and measures those reference signals (204, 206, 208). In some embodiments, the reference signals (204, 206, 208) are one of base station beacon signals and base station pilot channel signals. The peer to peer wireless terminal 202 selects a frequency to use for peer to peer communications as a function of the signal measurements, e.g., selects the frequency band corresponding to the smallest channel gain.

FIG. 2 also includes a flowchart 250 of an exemplary method of operating a peer to peer communications device in accordance with various embodiments. Operation starts in step 252, where the peer to peer communications device is powered on and initialized. Operation proceeds from step 252 to step 254. In step 254 the peer to peer communications device measures the received power level of base station reference signals corresponding to different frequency bands. In some embodiments, step 254 includes sub-steps 256, 258 and 260. In sub-step 256, the peer to peer communications device measures the received power level of a reference signal from a first base station, e.g., a reference signal from base station 1 108, corresponding to a first frequency, e.g., corresponding to frequency $f_1$. For example, the signal measured in sub-step 256 is signal 204. In sub-step 258, the peer to peer communications device measures the received power level of a reference signal from a second base station, e.g., a reference signal from base station 2 110, corresponding to a second frequency, e.g., corresponding to frequency $f_2$. For example, the signal measured in sub-step 258 is signal 206. In sub-step 260, the peer to peer communications device measures the received power level of a reference signal from a third base station, e.g., a reference signal from base station 3 112, corresponding to a third frequency, e.g., corresponding to frequency $f_3$. For example, the signal measured in sub-step 260 is signal 208. Operation proceeds from step 254 to step 262.

In step 262, the peer to peer wireless communications device selects a frequency to use as a function of the measured power level information. In some embodiments, step 262 includes sub-steps 264 and 266. In sub-step 264, the peer to peer communications device determines the smallest channel gain, e.g., determines which received base station reference signal strength is the lowest. Then, in sub-step 266 the peer to peer communications device determines the frequency corresponding to the smallest channel gain. For example, in the example of drawing 200 consider that the signal 208 is received at the lowest power level since peer to peer device 202 is furthest away from base station 112. In such a case peer to peer communications device 202 selects frequency $f_3$ to use since frequency $f_3$ corresponds to signal 208.

Operation proceeds from step 262 to step 268. In step 268, the peer to peer communications device communicates, e.g., transmits or receives, a peer to peer signal using the selected frequency from step 262.

Figure 3:
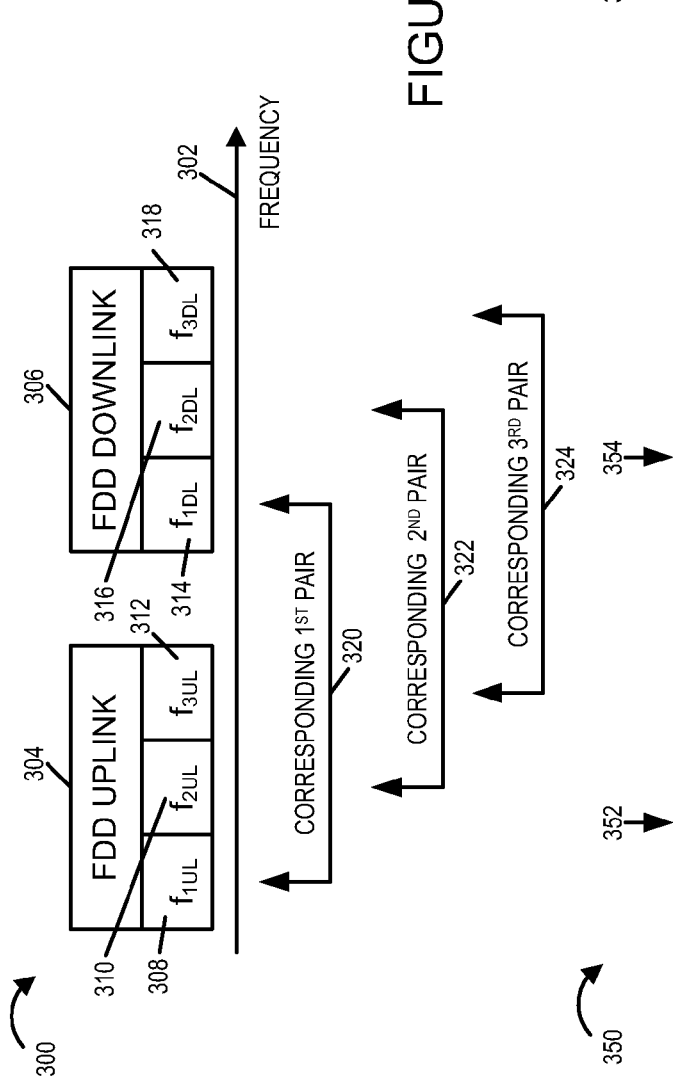
FIG. 3 includes a drawing illustrating exemplary pairs of frequency bands in an exemplary frequency division duplex (FDD) wide area network (WAN) communications system which also supports peer to peer signaling, and a table illustrating exemplary peer to peer related information including exemplary selection criteria.

FIG. 3 includes a drawing 300 illustrating exemplary pairs of frequency bands in an exemplary FDD WAN communications system which also supports peer to peer signaling, and a table 350 illustrating exemplary peer to peer related information including exemplary selection criteria. Horizontal line 302 represents frequency which includes a frequency division duplex uplink 304 and a frequency division duplex downlink 306. The FDD uplink 304 is partitioned to include (first portion 308, second portion 310, third portion 312) associated with (frequency $f_{1UL}$, frequency $f_{2UL}$, frequency $f_{3UL}$), respectively. The FDD downlink 306 is partitioned to include (first portion 314, second portion 316, third portion 318) associated with (frequency $f_{1DL}$, frequency $f_{2DL}$, frequency $f_{3DL}$), respectively. The uplink band 308 associated with $f_{1UL}$ and the downlink band 314 associated with $f_{1DL}$ form a $1^{st}$ corresponding pair as indicated by arrow 320. The uplink band 310 associated with $f_{2UL}$ and the downlink band 316 associated with $f_{2DL}$ form a $2^{nd}$ corresponding pair as indicated by arrow 322. The uplink band 312 associated with $f_{3UL}$ and the downlink band 318 associated with $f_{3DL}$ form a $3^{rd}$ corresponding pair as indicated by arrow 324. Table 350 includes a first column 352 which indicates the WAN frequency band used for peer to peer signaling, a second column 354 which indicates measured signals used by peer to peer wireless terminals for band selection, and a third column 356 which indicates exemplary selection criteria.

Row 358 indicates that if the WAN frequency band being used for peer to peer signaling is a WAN uplink band, the measured signals used by a peer to peer wireless terminal for band selection are base station broadcast signals, e.g., base station beacon signals in the WAN downlink band. Row 358 further indicates that under such a scenario, in some embodiments, the peer to peer wireless terminal selects an uplink band corresponding to the weakest received WAN base station broadcast signal, e.g., the weakest received base station beacon signal. For example, consider that a peer to peer wireless terminal monitors for and receives a broadcast signal, e.g., a beacon signal, from downlink bands (314, 316, 318). Continuing with the example, consider that a peer to peer wireless terminal determines that the weakest received signal is from the downlink band with frequency $f_{2DL}$ 316. Under this exemplary selection criteria, the peer to peer wireless terminal selects to use the uplink band associated with $f_{2UL}$ 310 for peer to peer signaling communications.

Row 360 indicates that if the WAN frequency band being used for peer to peer signaling is a WAN downlink band, the measured signals used by a peer to peer wireless terminal for band selection are WAN wireless terminal transmission signals, e.g., a WAN mobile node user beacon broadcast signal in the uplink band, a WAN mobile node dedicated control channel uplink signal in the uplink band or a WAN mobile node user reverse pilot signal in the uplink band. Row 360 further indicates that under such a scenario, in some embodiments, the peer to peer wireless terminal selects a downlink band corresponding to the weakest received WAN WT transmission signal, e.g., the weakest received WAN mobile node user beacon broadcast signal in the uplink band, a WAN mobile node dedicated control channel uplink signal in the uplink band or a WAN mobile node user reverse pilot signal in the uplink band. For example, consider that a peer to peer wireless terminal monitors for and receives transmission signals from WAN WTs, e.g., WAN WT beacon signal, in uplink bands (308, 310, 312). The peer to peer WT identifies the strongest received WAN WT beacon signal corresponding to each of the bands (308, 310, 312). Then the peer to peer wireless terminal identifies which one of those signals is the weakest. Continuing with the example, consider that a peer to peer wireless terminal determines that the weakest received signal of the three strongest signals is from the uplink band with frequency $f_{3UL}$ 312. Under this exemplary selection criteria, the peer to peer wireless terminal selects to use the downlink band associated with $f_{3DL}$ 318 for peer to peer signaling communications.

Figure 4:
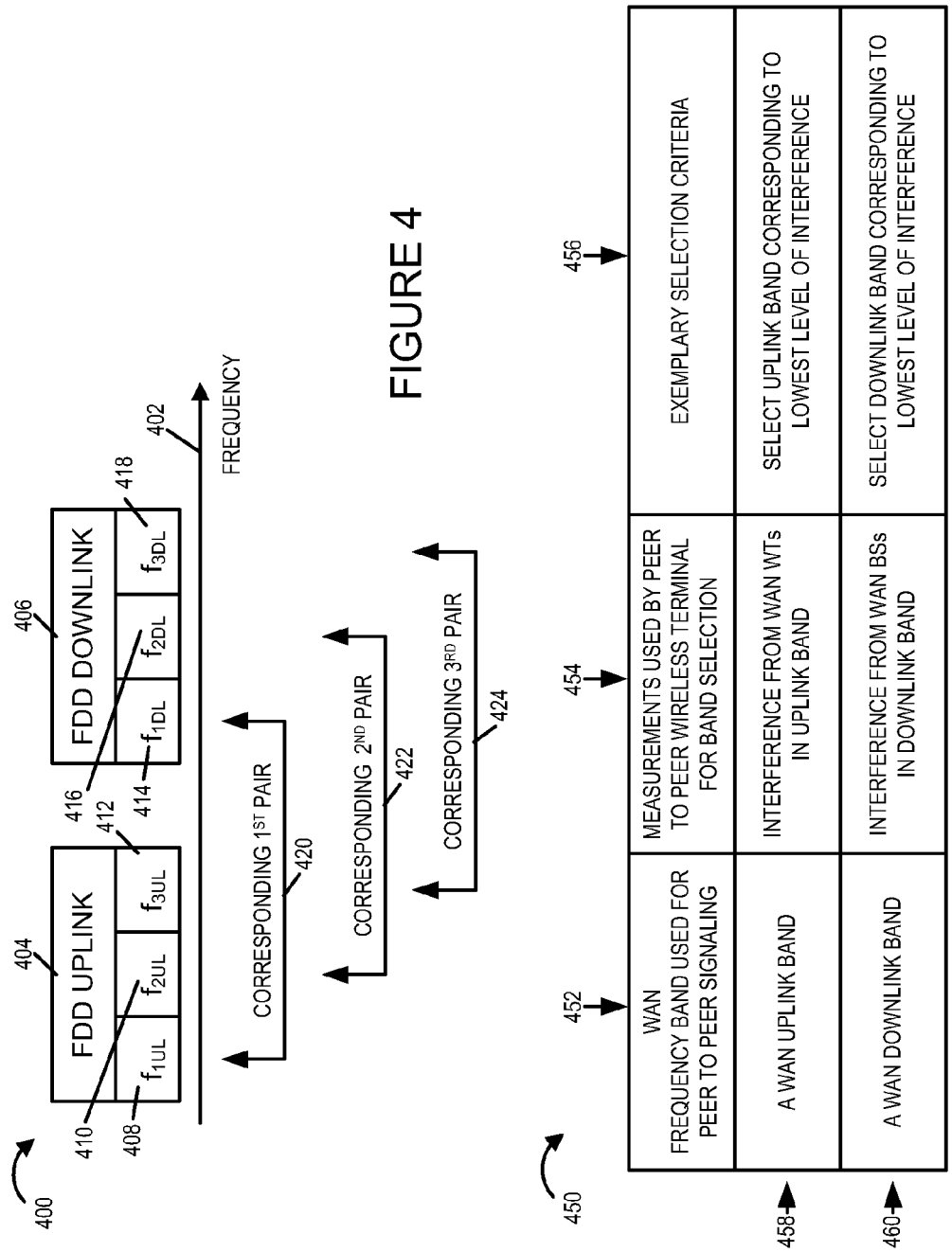
FIG. 4 includes a drawing illustrating exemplary pairs of frequency bands in an exemplary FDD WAN communications system which also supports peer to peer signaling, and a table illustrating exemplary peer to peer related information including exemplary selection criteria.

FIG. 4 includes a drawing 400 illustrating exemplary pairs of frequency bands in an exemplary FDD WAN communications system which also supports peer to peer signaling, and a table 450 illustrating exemplary peer to peer related information including exemplary selection criteria. Horizontal line 402 represents frequency which includes a frequency division duplex uplink 404 and a frequency division duplex downlink 406. The FDD uplink 404 is partitioned to include (first portion 408, second portion 410, third portion 412) associated with (frequency $f_{1UL}$, frequency $f_{2UL}$, frequency $f_{3UL}$), respectively. The FDD downlink 406 is partitioned to include (first portion 414, second portion 416, third portion 418) associated with (frequency $f_{1DL}$, frequency $f_{2DL}$, frequency $f_{3DL}$), respectively. The uplink band 408 associated with $f_{1UL}$ and the downlink band 414 associated with $f_{1DL}$ form a 1$^{st}$ corresponding pair as indicated by arrow 420. The uplink band 410 associated with $f_{2UL}$ and the downlink band 416 associated with $f_{2DL}$ form a 2$^{nd}$ corresponding pair as indicated by arrow 422. The uplink band 412 associated with $f_{3UL}$ and the downlink band 418 associated with $f_{3DL}$ form a 3$^{rd}$ corresponding pair as indicated by arrow 424. Table 450 includes a first column 452 which indicates the WAN frequency band used for peer to peer signaling, a second column 454 which indicates measurements used by peer to peer wireless terminals for band selection, and a third column 456 which indicates exemplary selection criteria.

Row 458 indicates that if the WAN frequency band being used for peer to peer signaling is a WAN uplink band, the measurements used by a peer to peer wireless terminal for band selection are interference from WAN WTs in the uplink band. Row 458 further indicates that under such a scenario, in some embodiments, the peer to peer wireless terminal selects an uplink band corresponding to the lowest level of interference. For example, consider that a peer to peer wireless terminal monitors for and receives uplink signals from WAN WTs in each of the uplink bands (408, 410, 412), the received WAN WT uplink signals representing interference from the perspective of the peer to peer wireless terminal which would like to use the same uplink band for peer to peer signaling. Continuing with the example, consider that a peer to peer wireless terminal determines that the lowest level of interference is from the upband with frequency $f_{1UL}$ 408, under this exemplary selection criteria, the peer to peer wireless terminal selects to use the uplink band associated with $f_{1UL}$ 408 for peer to peer signaling communications.

Row 460 indicates that if the WAN frequency band being used for peer to peer signaling is a WAN downlink band, the measurements used by a peer to peer wireless terminal for band selection are interference measurements from WAN base stations in the downlink band. Row 460 further indicates that under such a scenario, in some embodiments, the peer to peer wireless terminal selects a downlink band corresponding to the lowest level of interference. For example, consider that a peer to peer wireless terminal monitors for and receives downlink signals from WAN base stations in each of the uplink bands (408, 410,412), the received WAN base station downlink signals representing interference from the perspective of the peer to peer wireless terminal which would like to use the same downlink band for peer to peer signaling. Continuing with the example, consider that a peer to peer wireless terminal determines that the lowest level of interference is from the downlink band with frequency $f_{2DL}$ 416. Under this exemplary selection criteria, the peer to peer wireless terminal selects to use the downlink band associated with $f_{2DL}$ 416 for peer to peer signaling communications.

Figure 5:
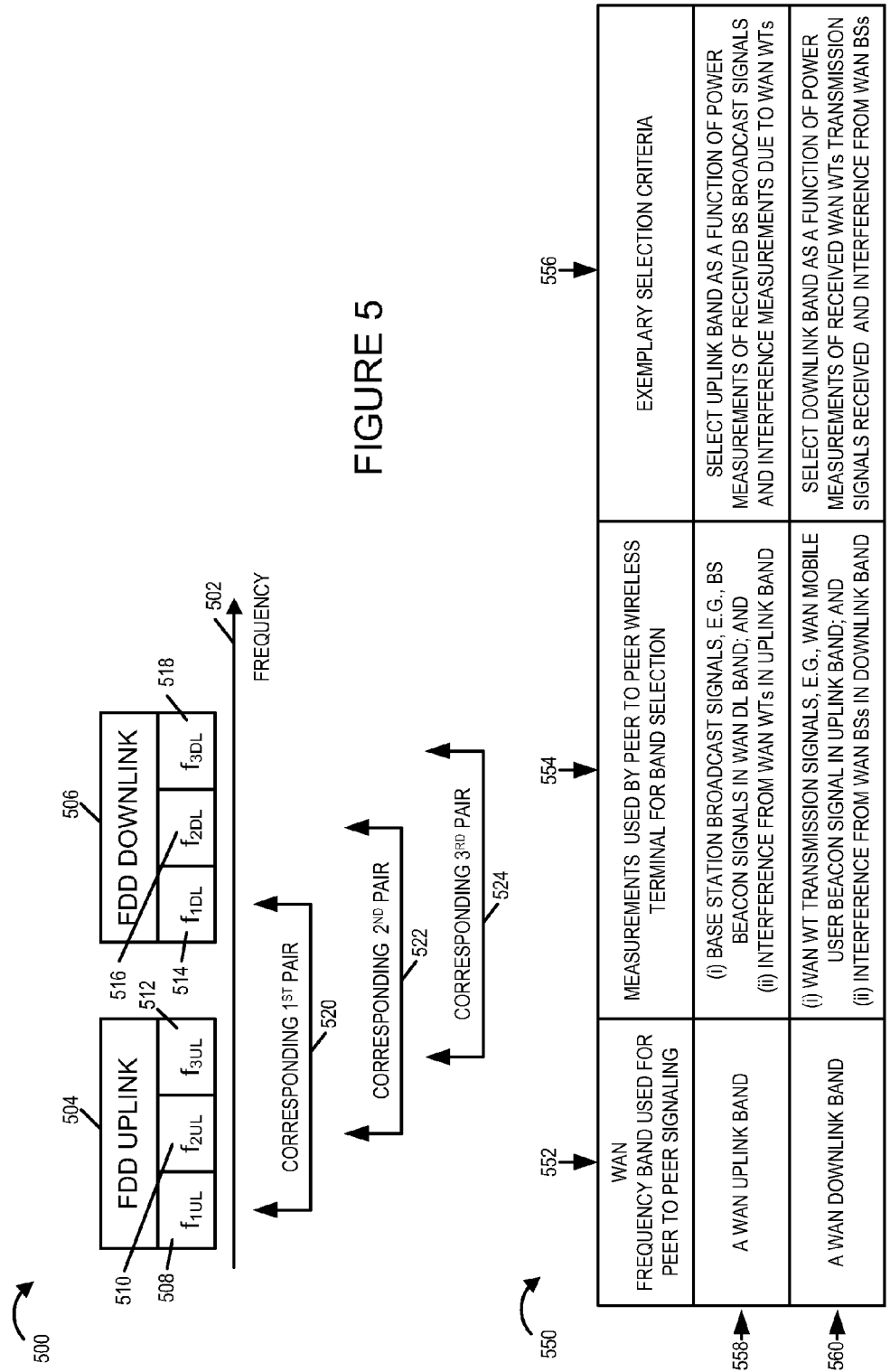
FIG. 5 illustrates an exemplary embodiment incorporating features represented by both FIG. 3 and FIG. 4.

Note that the approach of the examples of FIG. 3 favors the WAN communications devices, with the peer to peer band being selected to minimize impact to WAN signaling, e.g., minimize impact to wide area network signaling reception and recovery. Alternatively, the approach of the examples of FIG. 4 favors the peer to peer communications devices, with the peer to peer band being selected to minimize impact to peer to peer signaling reception and recovery. FIG. 5 illustrates exemplary embodiments incorporating features represented by both FIG. 3 and FIG. 4.

FIG. 5 includes a drawing 500 illustrating exemplary pairs of frequency bands in an exemplary FDD WAN communications system which also supports peer to peer signaling, and a table 550 illustrating exemplary peer to peer related information including exemplary selection criteria. Horizontal line 502 represents frequency which includes a frequency division duplex uplink 504 and a frequency division duplex downlink 506. The FDD uplink 504 is partitioned to include (first portion 508, second portion 510, third portion 512) associated with (frequency $f_{1UL}$, frequency $f_{2UL}$, frequency $f_{3UL}$), respectively. The FDD downlink 506 is partitioned to include (first portion 514, second portion 516, third portion 518) associated with (frequency $f_{1DL}$, frequency $f_{2DL}$, frequency $f_{3DL}$), respectively. The uplink band 508 associated with $f_{1UL}$ and the downlink band 514 associated with $f_{1DL}$ form a 1$^{st}$ corresponding pair as indicated by arrow 520. The uplink band 510 associated with $f_{2UL}$ and the downlink band 516 associated with $f_{2DL}$ form a 2$^{nd}$ corresponding pair as indicated by arrow 522. The uplink band 512 associated with $f_{3UL}$ and the downlink band 518 associated with $f_{3DL}$ form a 3$^{rd}$ corresponding pair as indicated by arrow 524. Table 550 includes a first column 552 which indicates the WAN frequency band used for peer to peer signaling, a second column 554 which indicates measurements used by peer to peer wireless terminals for band selection, and a third column 556 which indicates exemplary selection criteria.

Row 558 indicates that if the WAN frequency band being used for peer to peer signaling is a WAN uplink band, the measurements used by a peer to peer wireless terminal for band selection are: (i) measurements of base station broadcast signals, e.g., base station beacon signals in the WAN downlink band and (ii) measurements of interference from WAN WTs in the uplink. Row 558 further indicates that under such a scenario, in some embodiments, the peer to peer wireless terminal selects an uplink band as a function of power measurements of received base station broadcast signals and interference measurements from the perspective of the peer to peer device corresponding to signals transmitted from WAN WTs.

Row 560 indicates that if the WAN frequency band being used for peer to peer signaling is a WAN downlink band, the measurements used by a peer to peer wireless terminal for band selection are: (i) measurements of WAN WT transmission signals, e.g., measurements of received WAN mobile node user beacon signal or measurements of received WAN mobile node dedicated control channel uplink signals, or measurements of received reverse link pilot channel signals, in the uplink and (ii) measurements of interference from WAN BSs in the downlink band. Row 560 further indicates that under such a scenario, in some embodiments, the peer to peer wireless terminal selects a downlink band as a function of power measurements or received transmission signals from WAN WTs and measurements of interference from WAN base stations from the perspective of the peer to peer wireless terminal, In some embodiments, the relative weighting or impact to selection of a communications band using the selection criteria of column 556 changes as a function of at least one of the user of the peer to peer wireless terminal, a priority level, and a tier service level. For example, if the user of the peer to peer wireless terminal is an ordinary peer to peer user, the WAN wireless communications, in some embodiments, are favored and the impact to WAN signal reception has a high priority. For example, for uplink band selection a higher weighting is given to considerations of received power measurements from the base station broadcast signals than from interference being generated by WAN WT signaling. As another example, if the user of the peer to peer wireless terminal is a high priority user, e.g., an emergency services user, then a higher weighting is given to consideration of interference being experienced which impacts peer to peer communications than for interference being generated by the peer to peer device which affects WAN signaling communications. For example, for uplink band selection a higher weighting is given to measured interference from WAN WTs in the uplink band than to power measurements of received base station signaling.

FIG. 6 is a drawing 600 illustrating exemplary communications bands in a time division duplex system where different cells use different TDD duplex bands, and wherein at least some of air link resources are shared between WAN and peer to peer communications. Horizontal axis 602 indicates time. Block 604 indicates that exemplary cell 1 uses a first communications band identified by frequency $f_1$. Block 606 indicates that exemplary cell 2 uses a second communications band identified by frequency $f_2$. In this example bands 604 and 606 are non-overlapping. Corresponding to TDD frequency band 604 associated with frequency $f_1$ and cell 1 there are a sequence of uplink and downlink time slots (uplink slot 608, downlink slot 610, uplink slot 612, downlink slot 614, . . . ). Arrow 615 indicates that the same TDD frequency band 604 is used for both uplink and downlink for cell 1, but corresponding to different times. Corresponding to TDD frequency band 606 associated with frequency $f_2$ and cell 2 there are a sequence of uplink and downlink time slots (uplink slot 616, downlink slot 618, uplink slot 620, downlink slot 622, . . . ). Arrow 624 indicates that the same TDD frequency band 606 is used for both uplink and downlink for cell 2, but corresponding to different times FIG. 7 is a drawing 700 illustrating exemplary communications bands in a time division duplex system where different cells using the same TDD bands but at different times, and wherein at least some of air link resources are shared between WAN and peer to peer communications. Horizontal axis 702 indicates time. Block 704 indicates a first communications band identified by frequency $f_1$. Block 706 indicates a second communications band identified by frequency $f_2$. In this example bands 604 and 606 are non-overlapping. For the frequency band 704 identified by frequency f1, there are a sequence of air link resources corresponding to different time slots (resource 708 for time slot T1, resource 710 for time slot T2, resource 712 for time slot T3, resource 714 for time slot T4). This pattern repeats as indicated by the sequence of: resource 716 for time slot T1, resource 718 for time slot T2, resource 720 for time slot T3, resource 722 for time slot T4. For the frequency band 706 identified by frequency $f_2$, there are a sequence of air link resources corresponding to different time slots (resource 728 for time slot T1, resource 730 for time slot T2, resource 732 for time slot T3, resource 734 for time slot T4). This pattern repeats as indicated by the sequence of: resource 736 for time slot T1, resource 738 for time slot T2, resource 740 for time slot T3, resource 742 for time slot T4.

In this example slots designated T1 and T2 are used for the WAN uplink as indicated by arrow 748, while slots designated T3 and T4 are used for the WAN downlink as indicated by arrow 750. Arrow 752 identifies that time slot T1 in combination with both frequency bands (704, 706) represents the cell 1 uplink WAN communications band. Arrow 754 identifies that time slot T2 in combination with both frequency bands (704, 706) represents the cell 2 uplink WAN communications band. Arrow 756 identifies that time slot T3 in combination with both frequency bands (704, 706) represents the cell 1 downlink WAN communications band. Arrow 758 identifies that time slot T4 in combination with both frequency bands (704, 706) represents the cell 2 downlink WAN communications band. Arrow 724 indicates that both air link resource 708 and 712 form an uplink/downlink corresponding pair for cell 1 using TDD band 704. Arrow 726 indicates that both air link resource 710 and 714 form an uplink/downlink corresponding pair for cell 2 using TDD band 704. Arrow 744 indicates that both air link resource 728 and 732 form an uplink/downlink corresponding pair for cell 1 using TDD band 706. Arrow 746 indicates that both air link resource 730 and 734 form an uplink/downlink corresponding pair for cell 2 using TDD band 706.

Figure 8:
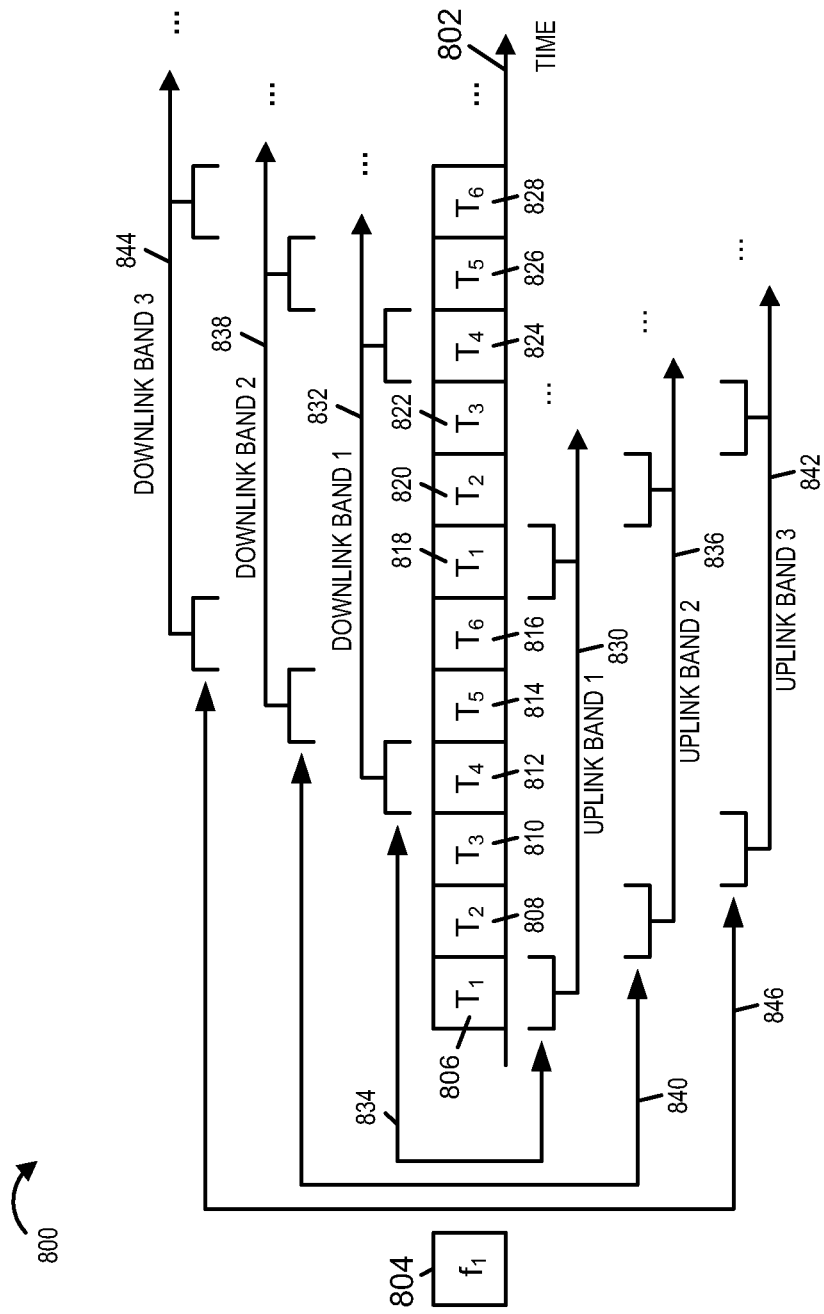
FIG. 8 is a drawing illustrating an exemplary frequency band in a TDD WAN system in which the same frequency band corresponds to multiple uplink/downlink bands, and wherein at least some of the air link resources are shared with peer to peer communications.

FIG. 8 is a drawing 800 illustrating an exemplary frequency band in a TDD WAN system in which the same frequency band corresponds to multiple uplink/downlink bands, and wherein at least some of the air link resources are shared with peer to peer communications. Horizontal axis 802 represents time. The frequency band 804 associated with frequency $f_1$ corresponds to (air link resource 806 during time slot T1, air link resource 808 during time slot T2, air link resource 810 during time slot T3, air link resource 812 during time slot T4, air link resource 814 during time slot T5, air link resource 816 during time slot T6, air link resource 818 during time slot T1, air link resource 820 during time slot T2, air link resource 822 during time slot T3, air link resource 824 during time slot T4, air link resource 826 during time slot T5, air link resource 828 during time slot T6, . . . ). Uplink band 1 corresponds to TDD frequency band 804 during the time slots designated T1 as indicated by designation indicator 830. Downlink band 1 corresponds to TDD frequency band 804 during the time slots designated T4 as indicated by designation indicator 832. Uplink band 1 and downlink band 1 form a first corresponding set as indicated by arrow 834. Uplink band 2 corresponds to TDD frequency band 804 during the time slots designated T2 as indicated by designation indicator 836. Downlink band 2 corresponds to TDD frequency band 804 during the time slots designated T5 as indicated by designation indicator 838. Uplink band 2 and downlink band 2 form a second corresponding set as indicated by arrow 840. Uplink band 3 corresponds to TDD frequency band 804 during the time slots designated T3 as indicated by designation indicator 842. Downlink band 3 corresponds to TDD frequency band 844 during the time slots designated T6 as indicated by designation indicator 844. Uplink band 3 and downlink band 3 form a third corresponding set as indicated by arrow 846.

Figure 9:
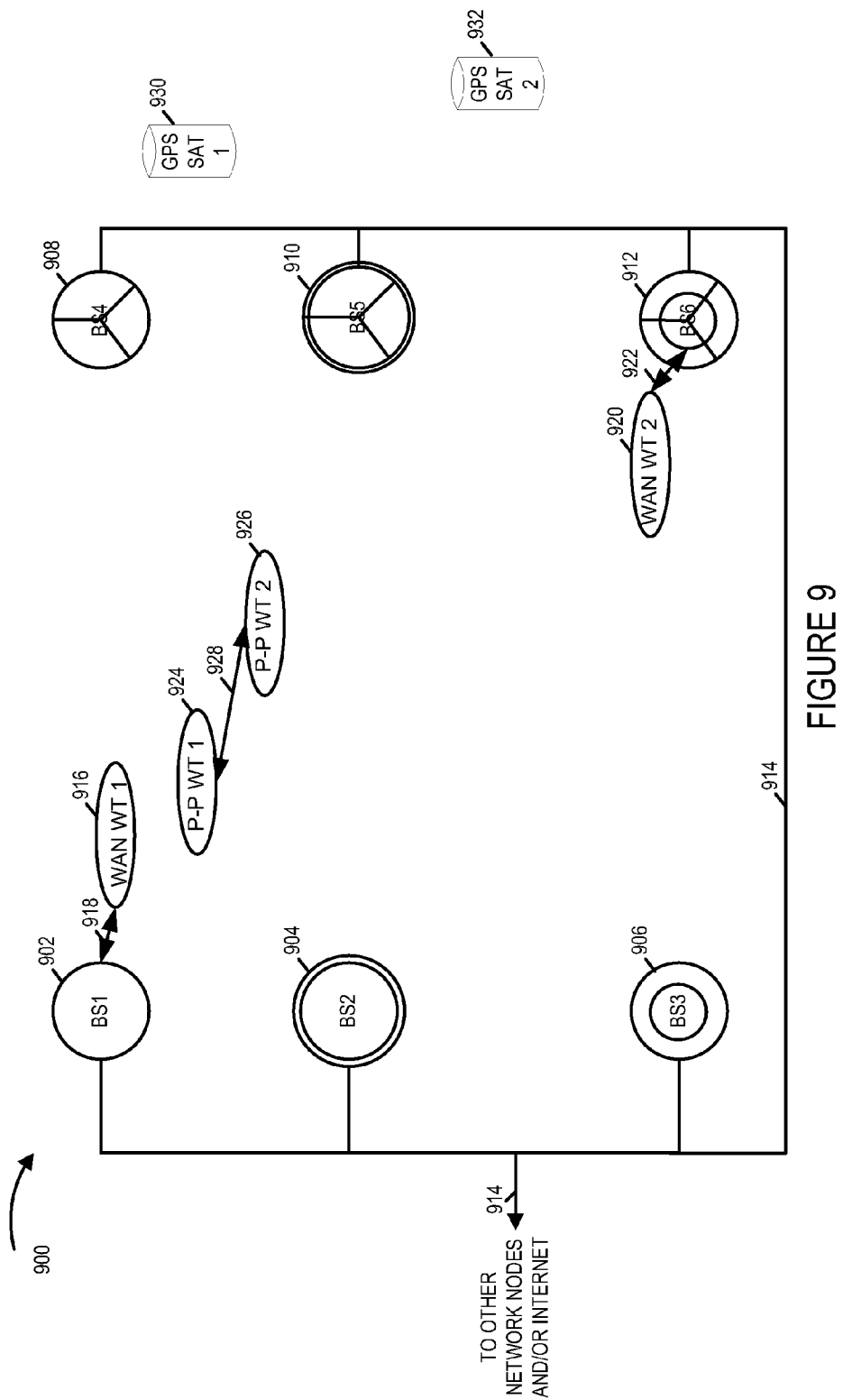
FIG. 9 is a drawing of an exemplary communications system supporting WAN signaling and peer to peer signaling in accordance with various embodiments.

FIG. 9 is a drawing of an exemplary communications system 900 supporting WAN signaling and peer to peer signaling in accordance with various embodiments. Exemplary communications system 900 includes a plurality of base stations (BS 1 902, BS 2 904, BS 3 906, BS 4 908, BS 5 910, BS 6 912) coupled together and to other network nodes, e.g., other base stations, home agent nodes, system control nodes, AAA nodes, etc., and/or the Internet via backhaul network 914. Exemplary communications system 900 also includes a plurality of WAN wireless terminals, e.g., mobile WAN WTs, (WAN WT 1 916, WAN WT 2 920) and a plurality of peer to peer wireless terminals, e.g. mobile peer to peer WTs, (P-P WT 1 924, P-P WT 2 926). WAN WT 1 916 is currently coupled to BS 1 902 via wireless link 918, while WAN WT 2 920 is currently coupled to an attachment point of BS 6 912 via wireless link 922. P-P wireless terminal 1 924 is communicating with P-P wireless terminal 2 926 via peer to peer communications link 928. Received signaling from WAN devices, e.g., base station and/or WAN WTs, in some embodiments, affects operations of the peer to peer wireless terminals (924, 926), e.g., in regards to band selection to use for peer to peer signaling. Exemplary GPS satellites (930, 932) are also shown. In some embodiments, received GPS signals affect operation of the peer to peer wireless terminals (924, 926), e.g., with the peer to peer wireless terminals determining location from the received signal, and using location information to determine from stored mapping information a designated band to use for peer to peer signaling. The designated band may be, and sometime is a band which is shared between WAN signaling use and peer to peer signaling use.

Exemplary base station 1 902 is a single sector base station supporting an uplink WAN communications band and a downlink WAN communications band. Exemplary base station 2 904 is a single sector base station supporting multiple uplink/downlink WAN communications band pairs with the different downlink bands corresponding to the same or substantially the same power reference levels. Exemplary base station 3 906 is a single sector base station supporting multiple uplink/downlink WAN communications band pairs with the different downlink bands corresponding to different power reference levels.

Exemplary base station 4 908 is a multi-sector base station supporting an uplink communications band/downlink WAN communications band pair in at least two sectors. Exemplary base station 5 910 is a multi-sector sector base station supporting multiple uplink/downlink WAN communications band pairs in at least two sectors with different downlink bands corresponding to the same or substantially the same power reference levels. Exemplary base station 6 912 is a multi-sector base station supporting multiple uplink/downlink WAN communications band pairs in at least two sectors with the different downlink bands corresponding to different power reference levels.

In some embodiments, each of the base stations uses a WAN FDD implementation. In some embodiments, each of the base stations uses a WAN FDD implementation. In some embodiments, portions of the communications system use WAN FDD while other portions of the communications system use WAN TDD.

The peer to peer wireless terminals (924, 926) may implement some or all of the methods described in the flowcharts of FIGS. 10, 11, 12, 13, 14, and 15 or any of the other described methods, e.g., methods described with respect to FIG. 1, 2, 3, 4, 5, 6, or 7. The peer to peer wireless terminals (924, 926) may be any of the peer to peer wireless terminals of FIG. 1, 2, 17, 18 or 19.

Figure 10:
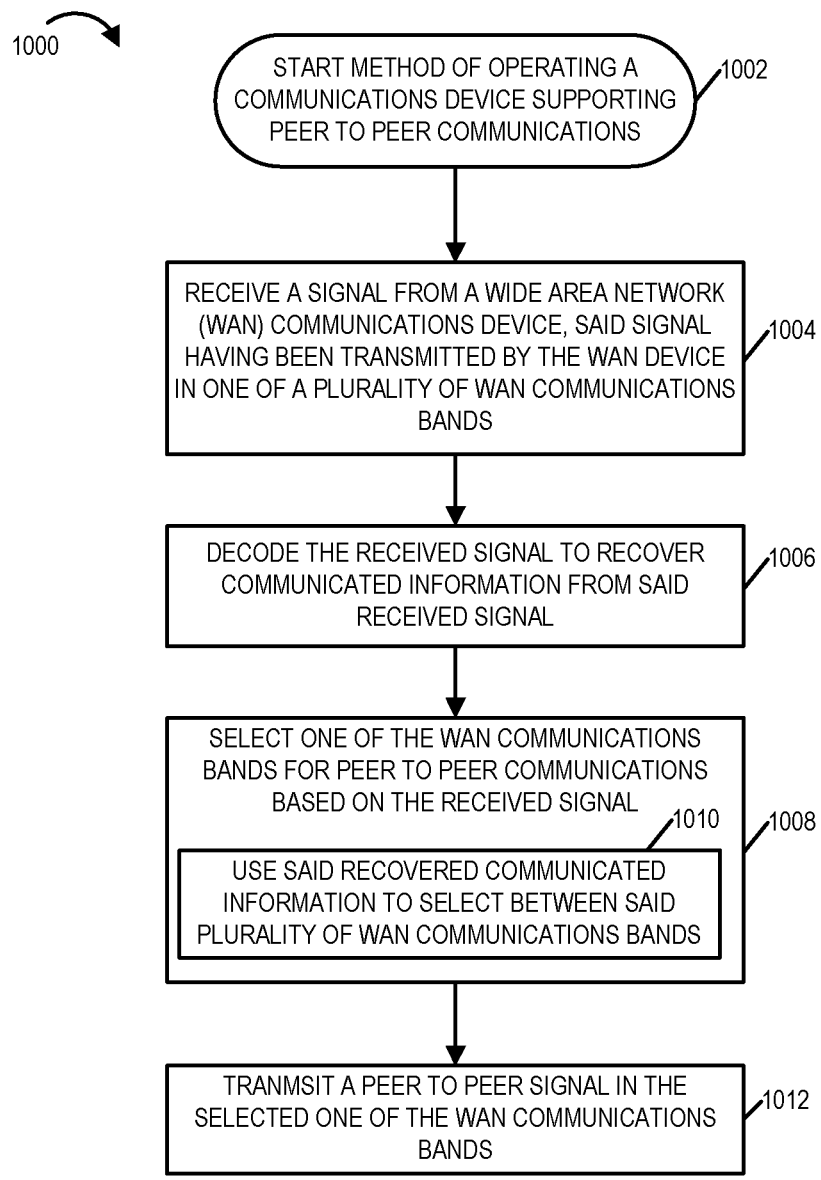
FIG. 10 is a flowchart of an exemplary method of operating a communications device supporting peer to peer communications in accordance with various embodiments.

FIG. 10 is a flowchart 1000 of an exemplary method of operating a communications device supporting peer to peer communications in accordance with various embodiments. Operation starts in step 1002, where the communications device is powered on and initialized and proceeds to step 1004. In step 1004, the communications device receives a signal from a wide area network (WAN) communications device, said signal having been transmitted by the WAN device in one of a plurality of WAN communications bands. Operation proceeds from step 1004 to step 1006.

In step 1006, the communications device decodes the received signal to recover communicated information from said received signal. In some embodiments, the recovered communicated information indicates one of the plurality of communications bands which is one of: i) unused by a sector of the WAN device from which the signal was received and ii) used by the sector of the WAN device from which the signal was received but at reduced power level in said sector relative to the other ones of said plurality of WAN frequency bands. In some such embodiments, the WAN device is a multi-sector base station. In some other such embodiments, the WAN device is a single sector base station and said sector is the single sector of said single sector base station.

Then, in step 1008, the communications device selects one of the WAN communications bands for peer to peer communications based on the received signal. Step 1008 includes sub-step 1010. In sub-step 1010, the communications device uses the recovered communicated information to select between said plurality of WAN communications bands. In some embodiments, selecting the WAN band indicates selecting the WAN communications band indicted by said information. In some embodiments, the selected communications band is different from the communications band from which the received signal was received.

Operation proceeds from step 1008 to step 1012. In step 1012, the communications device transmits a peer to peer signal in the selected one of the WAN communications bands.

In some embodiments, the plurality of WAN communications bands are frequency division duplex (FDD) bands, and the communications band from which the WAN signal is received is a WAN downlink communications band. In some such embodiments the selected communications band is a WAN uplink communications band.

In some other embodiments, the plurality of WAN communications bands are time division duplex (TDD) communications bands, and the WAN communications band from which the signal is received is received in a time slot within a downlink communications band. In some such embodiments, the selected communications band is an uplink band and said peer to peer signal is communicated in an uplink time slot of said uplink communications band, the uplink and downlink communications bands using the same frequency but at different times.

In some embodiments, the device from which the WAN signal is received is a WAN communications device in a frequency division duplex multi-cell communications system wherein at least one communications band is not used by a sector of at least one cell at any given time. In some embodiments, the device from which the WAN signal is received is a WAN communications device in a frequency division duplex multi-cell communications system wherein in at least one sector of a cell which uses multiple communications bands at the same time, one of the communications bands is used at a reduced power level relative to another one of the communications bands used in said sector. In some embodiments, the device from which the WAN is received is a WAN communications device which uses only a subset of said WAN communications bands, said subset including less than the full plurality of WAN communications bands.

Figure 11:
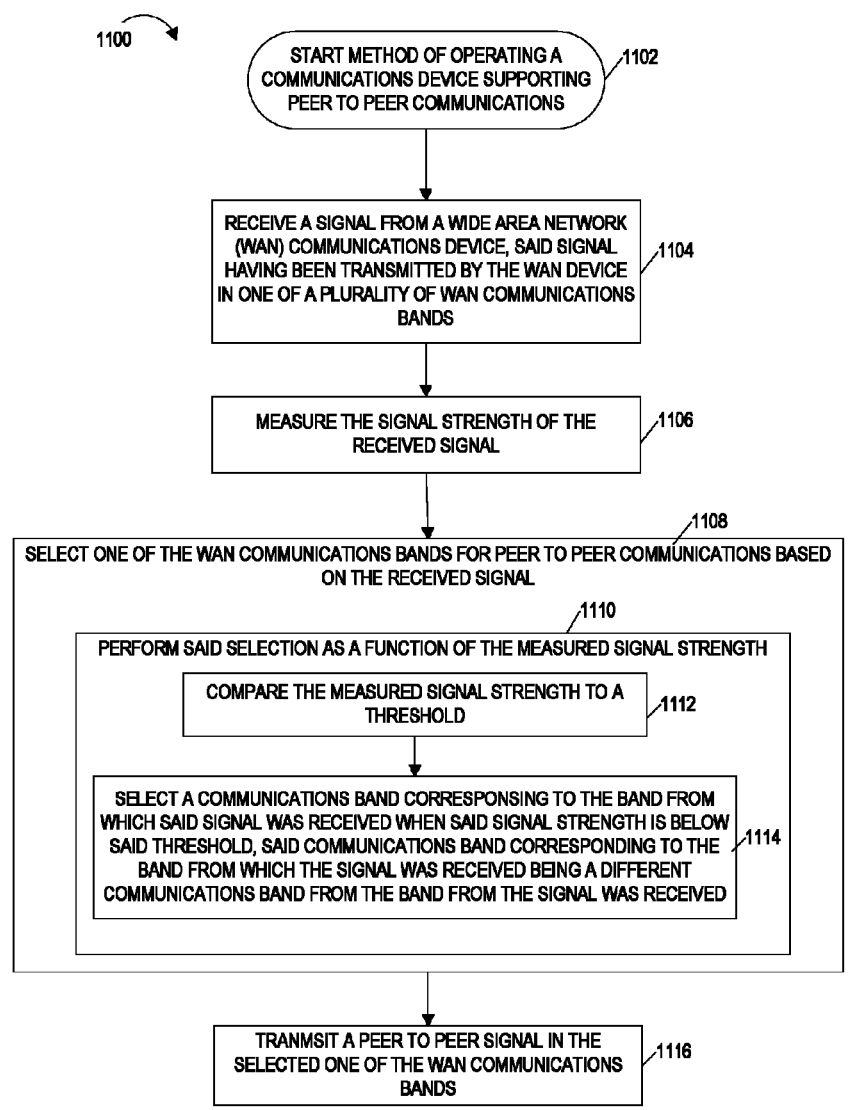
FIG. 11 is a flowchart of an exemplary method of operating a communications device supporting peer to peer communications in accordance with various embodiments.

FIG. 11 is a flowchart 1100 of an exemplary method of operating a communications device supporting peer to peer communications in accordance with various embodiments. Operation starts in step 1102, where the communications device is powered on and initialized and proceeds to step 1104.

In step 1104, the communications device receives a signal from a wide area network (WAN) communications device, said signal having been transmitted by the WAN device in one of a plurality of WAN communications bands. Operation proceeds from step 1104 to step 1106. In step 1106, the communications device measures the signal strength of the received signal.

Then, in step 1008, the communications device selects one of the WAN communications bands for peer to peer communications based on the received signal. Step 1108 includes sub-step 1010. In sub-step 1010, the communications device performs said selection as a function of the measured signal strength. Sub-step 1110 includes sub-step 1112 and 1114. In sub-step 1112, the communications device compares the measured signal strength to a threshold. Operation proceeds from sub-step 1112 to sub-step 1114. In sub-step 1114, the communications device selects a communications band corresponding to the band from which the said signal was received when said signal strength is below said threshold, said communications band corresponding to the band from which the signal was received, but being a different communications band from the band from which the signal was received. In some embodiments, the received signal is from a WAN base station and the communications band from which the signal is received is a downlink communications band, and the selected communications band is an uplink communications band corresponding to said downlink communications band.

Operation proceeds from step 1108 to step 1116. In step 1116, the communications device transmits a peer to peer signal in the selected one of the WAN communications bands.

In some such embodiments, the WAN device is a multi-sector base station. In some other such embodiments, the WAN device is a single sector base station.

In some embodiments, the plurality of WAN communications bands are frequency division duplex (FDD) bands, and the communications band from which the WAN signal is received is a WAN downlink communications band. In some such embodiments the selected communications band is a WAN uplink communications band.

In some other embodiments, the plurality of WAN communications bands are time division duplex (TDD) communications bands, and the WAN communications band from which the signal is received is received in a time slot within a downlink communications band. In some such embodiments, the selected communications band is an uplink band and said peer to peer signal is communicated in an uplink time slot of said uplink communications band, the uplink and downlink communications bands using the same frequency but at different times.

In some embodiments, the device from which the WAN signal is received is a WAN communications device in a frequency division duplex multi-cell communications system wherein at least one communications band is not used by a sector of at least one cell at any given time. In some embodiments, the device from which the WAN signal is received is a WAN communications device in a frequency division duplex multi-cell communications system wherein in at least one sector of a cell which uses multiple communications bands at the same time, one of the communications bands is used at a reduced power level relative to another one of the communications bands used in said sector. In some embodiments, the device from which the WAN is received is a WAN communications device which uses only a subset of said WAN communications bands, said subset including less than the full plurality of WAN communications bands.

Figure 12:
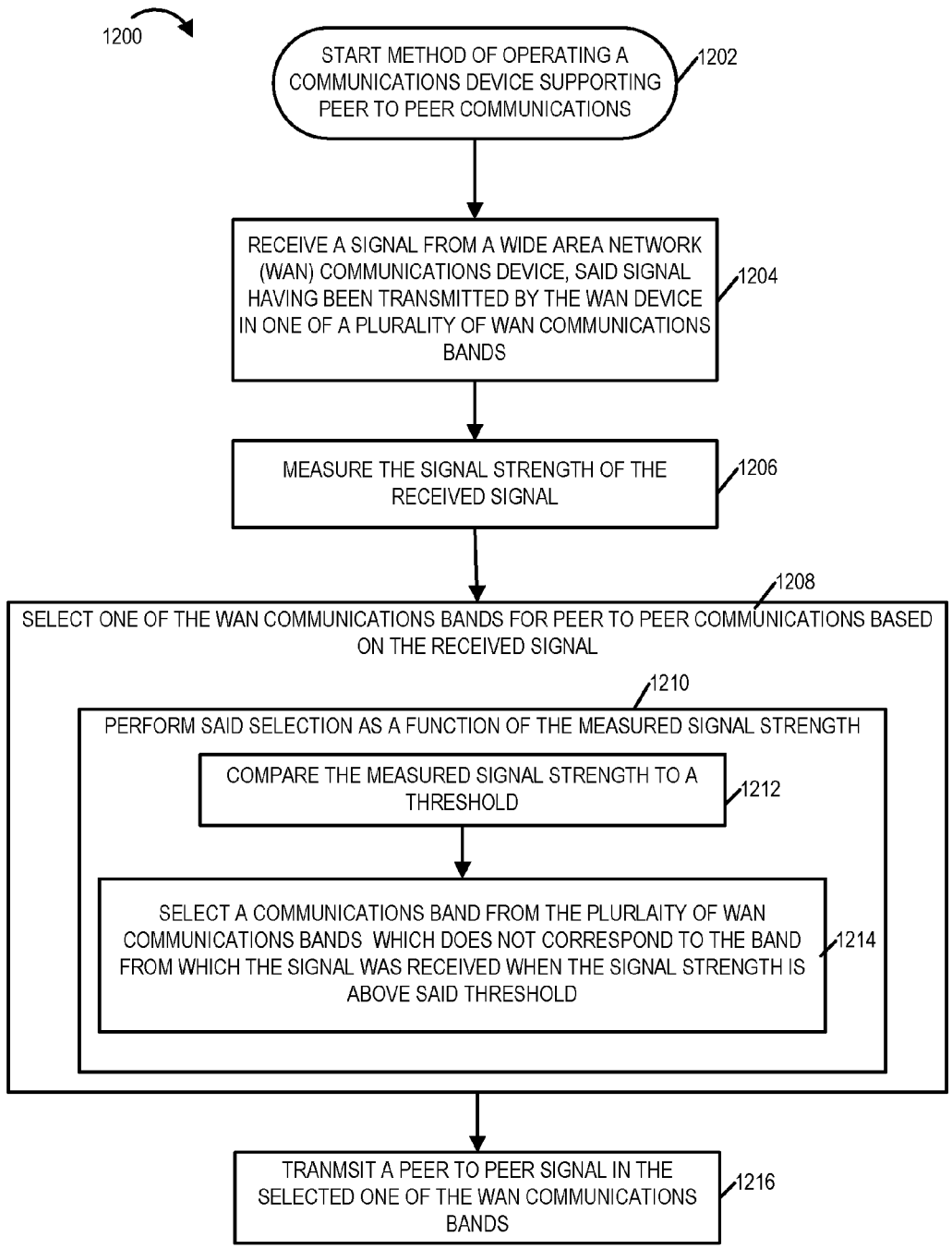
FIG. 12 is a flowchart of an exemplary method of operating a communications device supporting peer to peer communications in accordance with various embodiments.

FIG. 12 is a flowchart 1200 of an exemplary method of operating a communications device supporting peer to peer communications in accordance with various embodiments. Operation starts in step 1202, where the communications device is powered on and initialized and proceeds to step 1204.

In step 1204, the communications device receives a signal from a wide area network (WAN) communications device, said signal having been transmitted by the WAN device in one of a plurality of WAN communications bands. Operation proceeds from step 1204 to step 1206. In step 1206, the communications device measures the signal strength of the received signal.

Then, in step 1208, the communications device selects one of the WAN communications bands for peer to peer communications based on the received signal. Step 1208 includes sub-step 1210. In sub-step 1210, the communications device performs said selection as a function of the measured signal strength. Sub-step 1210 includes sub-steps 1212 and 1214. In sub-step 1212, the communications device compares the measured signal strength to a threshold. Operation proceeds from sub-step 1212 to sub-step 1214. In sub-step 1214, the communications device selects a communications band from the plurality of WAN communications bands which does not correspond to the band from which the signal was received when the signal strength is above said threshold.

Operation proceeds from step 1208 to step 1216. In step 1216, the communications device transmits a peer to peer signal in the selected one of the WAN communications bands.

In some such embodiments, the WAN device is a multi-sector base station. In some other such embodiments, the WAN device is a single sector base station.

In some embodiments, the plurality of WAN communications bands are frequency division duplex (FDD) bands, and the communications band from which the WAN signal is received is a WAN downlink communications band. In some such embodiments the selected communications band is a WAN uplink communications band.

In some other embodiments, the plurality of WAN communications bands are time division duplex (TDD) communications bands, and the WAN communications band from which the signal is received is received in a time slot within a downlink communications band. In some such embodiments, the selected communications band is an uplink band and said peer to peer signal is communicated in an uplink time slot of said uplink communications band, the uplink and downlink communications bands using the same frequency but at different times.

In some embodiments, the device from which the WAN signal is received is a WAN communications device in a frequency division duplex multi-cell communications system wherein at least one communications band is not used by a sector of at least one cell at any given time. In some embodiments, the device from which the WAN signal is received is a WAN communications device in a frequency division duplex multi-cell communications system wherein in at least one sector of a cell which uses multiple communications bands at the same time, one of the communications bands is used at a reduced power level relative to another one of the communications bands used in said sector. In some embodiments, the device from which the WAN is received is a WAN communications device which uses only a subset of said WAN communications bands, said subset including less than the full plurality of WAN communications bands.

Figure 13:
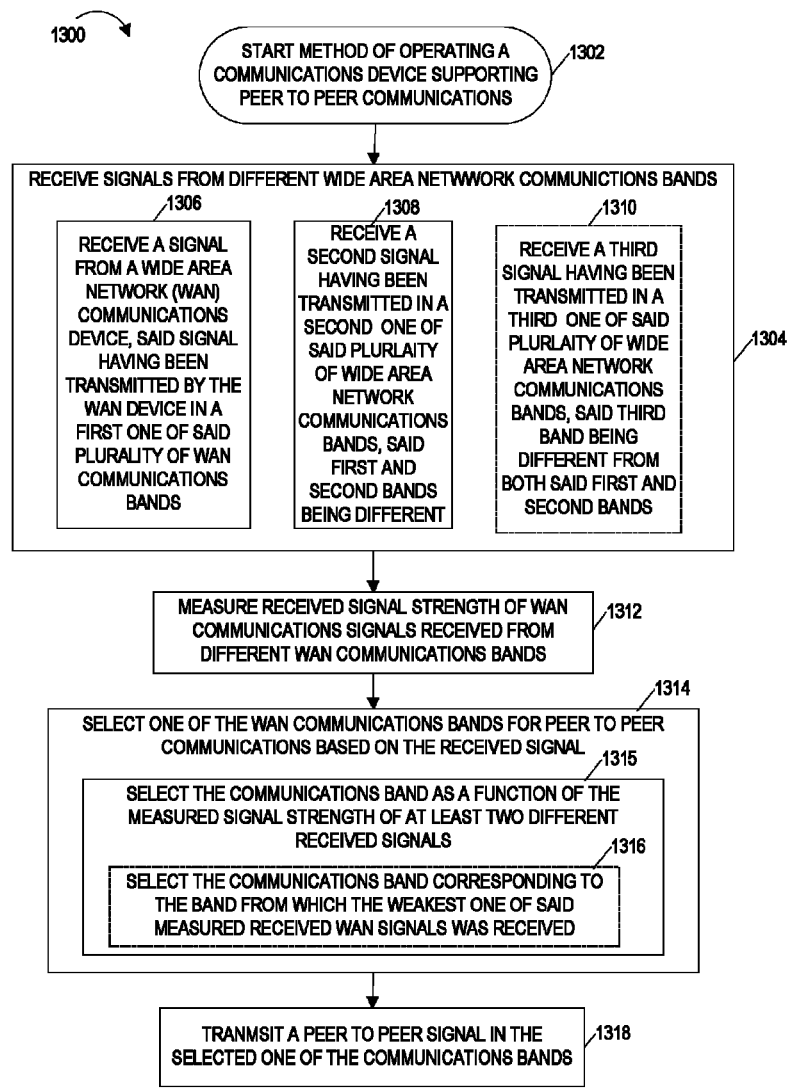
FIG. 13 is a flowchart of an exemplary method of operating a communications device supporting peer to peer communications in accordance with various embodiments.

FIG. 13 is a flowchart 1300 of an exemplary method of operating a communications device supporting peer to peer communications in accordance with various embodiments. Operation starts in step 1302, where the communications device is powered on and initialized and proceeds to step 1304.

In step 1304, the communications device receives signals from different wide area network communications bands. Step 1304 includes sub-steps 1306 and 1308. In some embodiments, step 1304, includes, during some times, sub-step 1310.

In sub-step 1306, the communications device receives a signal from a wide area network (WAN) communications device, said signal having been transmitted by the WAN device in a first one of said plurality of WAN communications bands. In sub-step 1308, the communications device receives a second signal from a wide area network (WAN) communications device, said second signal having been transmitted in a second one of said plurality of WAN communications bands, said first and second bands being different. In sub-step 1310, the communications device receives a third signal from a wide area network (WAN) communications device, said third signal having been transmitted in a third one of said plurality of WAN communications bands, said third band being different from said first and second communications bands. The same WAN device may have transmitted said first and second received signals. Alternatively, different WAN devices may have transmitted said first and second received signals. The same WAN device may have transmitted said third and at least one of said first and second received signals. A different WAN device may have transmitted said received third signal than transmitted said received first signal. A different WAN device may have transmitted said received third signal than transmitted said received second signal.

Operation proceeds from step 1304 to step 1312. In step 1312, the communications device measures the received signal strength of WAN communications signals received from different WAN communications bands. Operation proceeds from step 1312 to step 1314. In step 1314, the communications device selects one of the WAN communications bands for peer to peer communications based on the received signal. Step 1314 includes sub-step 1315. In sub-step 1315, the communications device selects the communications band as a function of the measured signal strength of at least two different received signals. In some embodiments, sub-step 1315 includes sub-step 1316. In sub-step 1316, the communications device selects the communications band which corresponds to the band from which the weakest one of said measured received WAN signals was received. Operation proceeds from step 1314 to step 1318. In step 1318, the communications device transmits a peer to peer signal in the selected one of the WAN communications bands.

In some such embodiments, one or more of the WAN devices are multi-sector base stations. In some embodiments, one or more of the WAN devices are single sector base stations.

In some embodiments, the plurality of WAN communications bands are frequency division duplex (FDD) bands, and the communications band from which the WAN signal is received is a WAN downlink communications band. In some such embodiments the selected communications band is a WAN uplink communications band.

In some other embodiments, the plurality of WAN communications bands are time division duplex (TDD) communications bands, and the WAN communications band from which the signal is received is received in a time slot within a downlink communications band. In some such embodiments, the selected communications band is an uplink band and said peer to peer signal is communicated in an uplink time slot of said uplink communications band, the uplink and downlink communications bands using the same frequency but at different times.

In some embodiments, a device from which the WAN signal is received is a WAN communications device in a frequency division duplex multi-cell communications system wherein at least one communications band is not used by a sector of at least one cell at any given time. In some embodiments, a device from which the WAN signal is received is a WAN communications device in a frequency division duplex multi-cell communications system wherein in at least one sector of a cell which uses multiple communications bands at the same time, one of the communications bands is used at a reduced power level relative to another one of the communications bands used in said sector. In some embodiments, a device from which the WAN is received is a WAN communications device which uses only a subset of said WAN communications bands, said subset including less than the full plurality of WAN communications bands.

Figure 14:
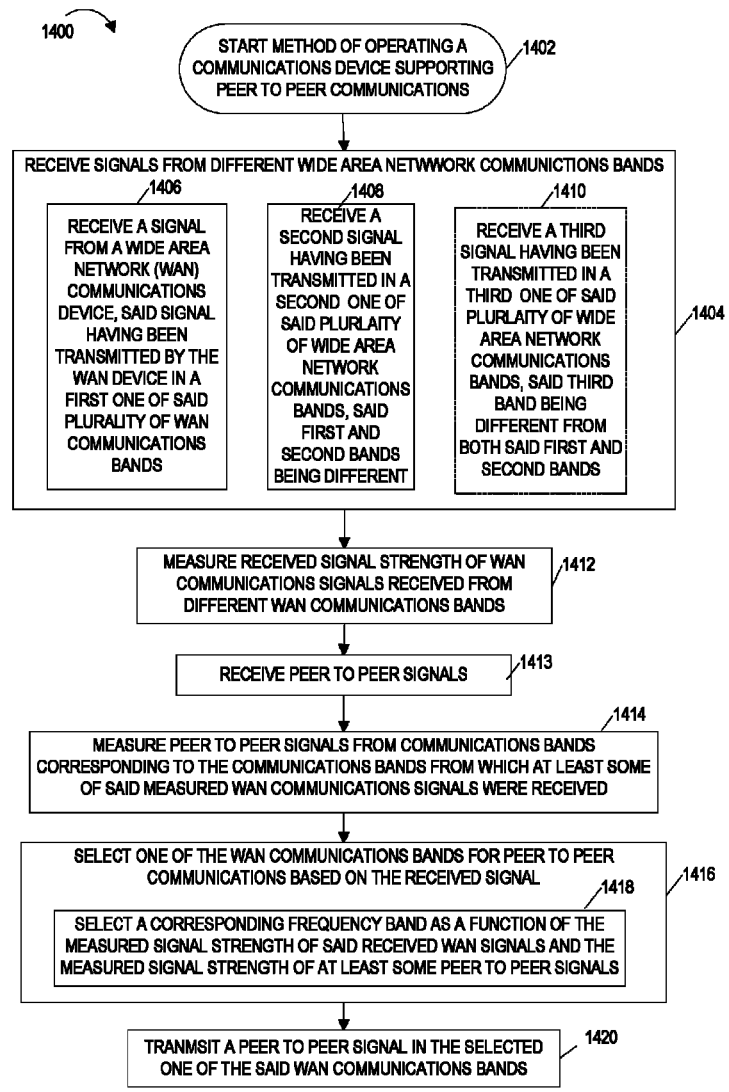
FIG. 14 is a flowchart of an exemplary method of operating a communications device supporting peer to peer communications in accordance with various embodiments.

FIG. 14 is a flowchart 1400 of an exemplary method of operating a communications device supporting peer to peer communications in accordance with various embodiments. Operation starts in step 1402, where the communications device is powered on and initialized and proceeds to step 1404.

In step 1404, the communications device receives signals from different wide area network communications bands. Step 1404 includes sub-steps 1406 and 1408. In some embodiments, step 1404 includes, during some times, sub-step 1410.

In sub-step 1406, the communications device receives a signal from a wide area network (WAN) communications device, said signal having been transmitted by the WAN device in a first one of said plurality of WAN communications bands. In sub-step 1408, the communications device receives a second signal from a wide area network (WAN) communications device, said second signal having been transmitted in a second one of said plurality of WAN communications bands, said first and second bands being different. In sub-step 1410, the communications device receives a third signal from a wide area network (WAN) communications device, said third signal having been transmitted in a third one of said plurality of WAN communications bands, said third band being different from said first and second communications bands. The same WAN device may have transmitted said first and second received signals. Alternatively, different WAN devices may have transmitted said first and second received signals. The same WAN device may have transmitted said third and at least one of said first and second received signals. A different WAN device may have transmitted said received third signal than transmitted said received first signal. A different WAN device may have transmitted said received third signal, then transmitted said received second signal.

Operation proceeds from step 1404 to step 1412. In step 1412, the communications device measures the received signal strength of WAN communications signals received from different WAN communications bands. Operation proceeds from step 1412 to step 1413, in which the communications devices receives peer to peer signals. Then, in step 1414, the communications device measures peer to peer signals from communications bands corresponding to the communications bands from which at least some of said measured WAN communications signals were received. For example, in some embodiments, if the WAN devices from which signals are received are base stations and the received WAN signals are downlink signals communicated in downlink bands, the received peer to peer signals are from peer to peer communications devices using uplink bands, said uplink bands being corresponding bands with respect to said downlink bands. As another example, in some embodiments, if the WAN devices from which signals are received are mobile nodes operating a cellular mode and the received WAN signals are uplink signals communicated in uplink bands, the received peer to peer signals are from peer to peer communications devices using uplink downlink, said downlink bands being corresponding bands with respect to said uplink bands.

Operation proceeds from step 1414 to step 1416. In step 1416, the communications device selects one of the WAN communications bands for peer to peer communications based on the received signal. Step 1416 includes sub-step 1418. In sub-step 1418, the communications device selects the communications band as a function of the measured signal strength of said received WAN signals and the measured signal strength of at least some peer to peer signals. Operation proceeds from step 1416 to step 1420. In step 1420, the communications device transmits a peer to peer signal in the selected one of the WAN communications bands.

In some such embodiments, one or more of the WAN devices are multi-sector base stations. In some embodiments, one or more of the WAN devices are single sector base stations.

In some embodiments, the plurality of WAN communications bands are frequency division duplex (FDD) bands, and the communications band from which the WAN signal is received is a WAN downlink communications band. In some such embodiments the selected communications band is a WAN uplink communications band.

In some other embodiments, the plurality of WAN communications bands are time division duplex (TDD) communications bands, and the WAN communications band from which the signal is received is received in a time slot within a downlink communications band. In some such embodiments, the selected communications band is an uplink band and said peer to peer signal is communicated in an uplink time slot of said uplink communications band, the uplink and downlink communications bands using the same frequency but at different times.

In some embodiments, a device from which the WAN signal is received is a WAN communications device in a frequency division duplex multi-cell communications system wherein at least one communications band is not used by a sector of at least one cell at any given time. In some embodiments, a device from which the WAN signal is received is a WAN communications device in a frequency division duplex multi-cell communications system wherein in at least one sector of a cell which uses multiple communications bands at the same time, one of the communications bands is used at a reduced power level relative to another one of the communications bands used in said sector. In some embodiments, a device from which the WAN is received is a WAN communications device which uses only a subset of said WAN communications bands, said subset including less than the full plurality of WAN communications bands.

Figure 15:
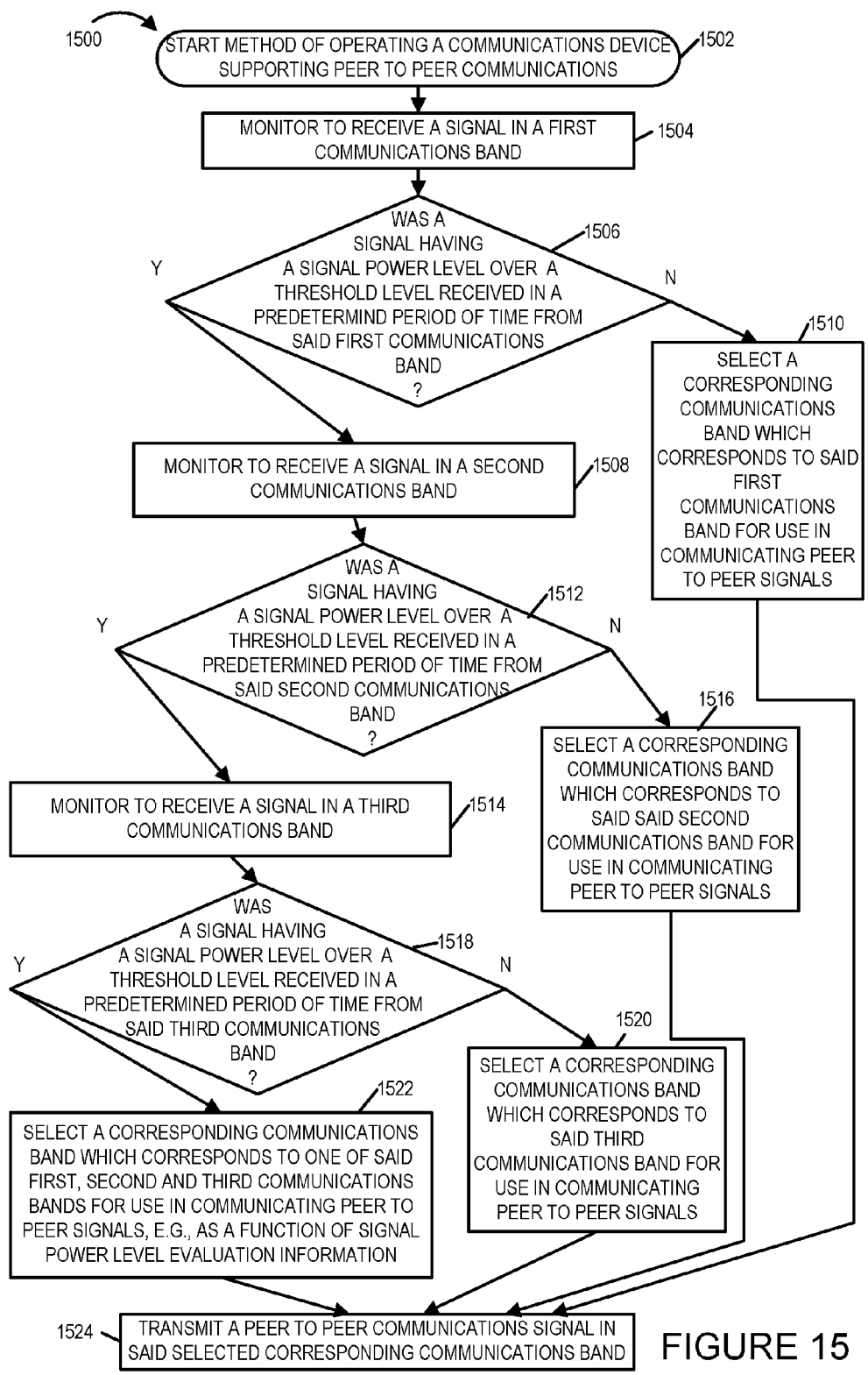
FIG. 15 is a flowchart of an exemplary method of operating a communications device supporting peer to peer communications in accordance with various embodiments.

FIG. 15 is a flowchart 1500 of an exemplary method of operating a communications device supporting peer to peer communications in accordance with various embodiments. For example, this exemplary method is used in some wireless communications systems including a plurality of wide area network communications bands, wherein at least some of the plurality of communications bands are not utilized by at least some base station sectors for cellular communications during at least some time periods. Operation starts in step 1502, where the communications device is powered on and initialized and proceeds to step 1504. In step 1504, the communications device monitors to receive a signal in a first communications band. Operation proceeds from step 1504 to step 1506.

In step 1506, the communications device determines if a signal having a signal power level over a threshold level was received in a predetermined period of time from said first communications band. If a signal having a signal power level over the threshold level was received operation proceeds from step 1506 to step 1508; otherwise operation proceeds from step 1506 to step 1510, in which the communications device selects a corresponding communications band which corresponds to said first communications band for use in communicating peer to peer signals.

Returning to step 1508, in step 1508, the communications device monitors to receive a signal in a second communications band. Operation proceeds from step 1508 to step 1512.

In step 1512, the communications device determines if a signal having a signal power level over a threshold level was received in a predetermined period of time from said second communications band. If a signal having a signal power level over the threshold level was received operation proceeds from step 1512 to step 1514; otherwise operation proceeds from step 1512 to step 1516, in which the communications device selects a corresponding communications band which corresponds to said second communications band for use in communicating peer to peer signals.

Returning to step 1514, in step 1514, the communications device monitors to receive a signal in a third communications band. Operation proceeds from step 1514 to step 1518.

In step 1518, the communications device determines if a signal having a signal power level over a threshold level was received in a predetermined period of time from said third communications band. If a signal having a signal power level over the threshold level was received operation proceeds from step 1518 to step 1522; otherwise operation proceeds from step 1518 to step 1520, in which the communications device selects a corresponding communications band which corresponds to said third communications band for use in communicating peer to peer signals.

Returning to step 1522, in step 1522 the communications device selects a corresponding communications band which corresponds to one of said first, second and third communications bands for use in communication of peer to peer signals. In some embodiments, the selection of step 1522 is performed as a function of signal power level information. For example, the communications device determines which one of said signals received from the first, second and third communications bands was received at the lowest power level and selects the peer to peer communications band as the band which corresponds to the band in which the lowest power level signal was received.

Operation proceeds from any of step 1510, 1516, 1520, and 1522 to step 1524. In step 1524, the communications device transmits a peer to peer communications signal in said selected corresponding communications band.

In some embodiments, a corresponding communications band is the same as a communications band. For example, lack of detected signal in a monitored communications band may, and sometimes does, indicate that the same communications band is available for peer to peer signaling usage.

In some embodiments, a corresponding communications band is different from a monitored communications band. For example, in some embodiments communications bands are paired, with one communications band being monitored for signals and with the corresponding band of the pair being conditionally available for peer to peer signaling. In some such embodiments, a communications band is a WAN downlink band in a frequency division duplex system and the corresponding frequency band is an uplink frequency band in said frequency division duplex system. For example, (first, second, and third) monitored communications bands are, in some embodiments, (first, second, and third) downlink communications bands which are non-overlapping. The (first, second, and third) downlink communications bands have (first, second, and third) corresponding uplink communications bands, respectively, which are non-overlapping, and the communications device selects one of said first, second, and third uplink communications bands for peer to peer signaling.

In some embodiments, a communications band is a WAN downlink band in a TDD system and a corresponding communications band is an uplink band in the TDD system.

Although the example of FIG. 15 has been illustrated for the case of three bands which are monitored, in other embodiments, a different number of bands are monitored. In some embodiments, only one band is monitored, and the wireless communications device is allowed to use its corresponding band for peer to peer signaling if no received signal having a power level above a threshold is received in a predetermined period of time. In some other embodiments, two bands or more than three bands are monitored, and the communications device determines which corresponding band to use as a function of power level information.

Figure 16:
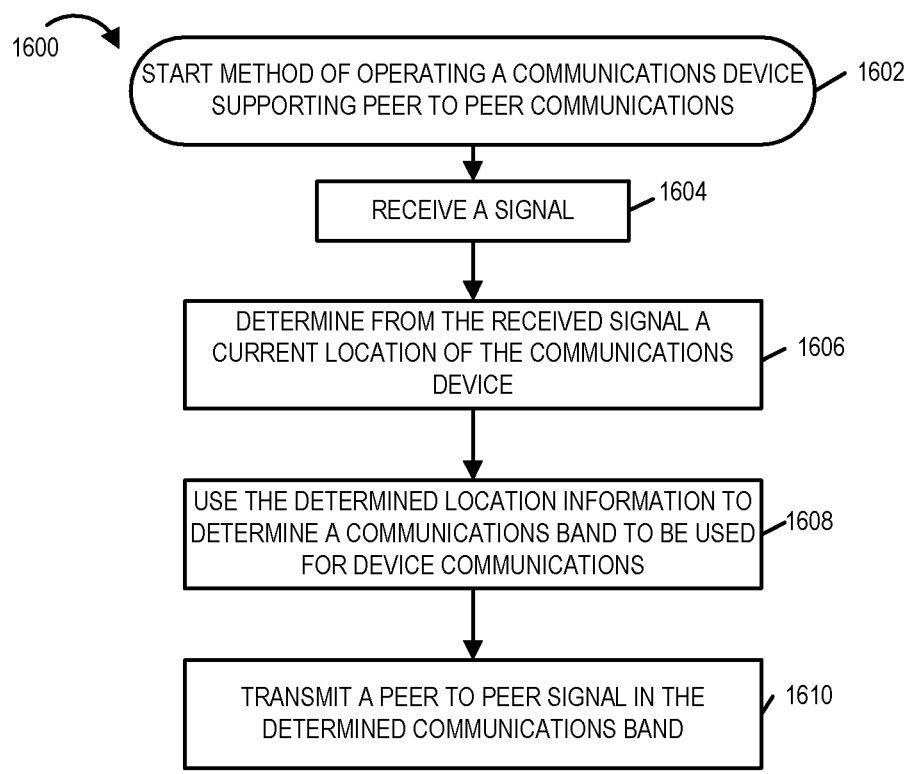
FIG. 16 is a flowchart of an exemplary method of operating a communications device supporting peer to peer communications in accordance with various embodiments.

FIG. 16 is a flowchart 1600 of an exemplary method of operating a communications device supporting peer to peer communications in accordance with various embodiments. Operation starts in step 1602, where the communications device is powered on and initialized and proceeds to step 1604, where the communications device receives a signal. In some embodiments, the received signal is a GPS signal. In some embodiments, the received signal is a user input signal received from a user input device included in said communications device. For example, the user input device is a keypad on the communications device and the user input signal indicates that the user has entered a particular address, e.g., intersection of two streets or a building address or a set of location information such as GPS coordinates or grid system coordinates. In some embodiments, the received signal is from an external device coupled to said communications device, e.g., the received signal is from a navigation device such as a vehicle navigation system or handheld navigation system coupled to said communications device. Then, in step 1606, the communications device determines from the received signal a current location of the communications device.

In some embodiments, the received signal is a cellular network signal. For example, the cellular network, in some embodiments, tracks location of communications devices using a plurality of location techniques including, e.g., GPS information, network attachment point information identifying base station and/or sector, historical information, power information, relative power information, dead spot information, reception information and/or interference information, and device estimated position information can be uploaded.

Operation proceeds from step 1606 to step 1608. In step 1608, the communications device uses the determined location information to determine a communications band to be used for communications with other devices. The determined communications band is, e.g., a peer to peer communications band. In some embodiments, different communications bands are determined for peer to peer and WAN communications at the determined current location.

In some embodiments using the determined location information includes performing a lookup operation in which the current location of the communications device is used to identify a communications band associated with the current location in a stored set of information. In various embodiments, the stored set of information includes information indicating communications bands to be used for peer to peer communications at a plurality of different locations. In some embodiments, the communications device further supports wide area network communications and the set of stored information further includes information indicating communications bands to be used for wide area network communications at a plurality of different locations.

In some embodiments, the stored set of information indicates different frequency bands to be used for peer to peer and wide area network communications at one location. In some embodiments, the stored set of information indicates information that indicates that the same frequency bands are to be used for peer to peer and wide area network communications at one location. In some embodiments, the stored set of information is stored in said communications device.

In some embodiments, using the determined location information includes: sending a query to a network device; and receiving from said network device an indication of the communications band associated with the current location. In some embodiments, the received indication of the communications band indicates a communications band identified by information included in a stored set of information accessed by the network device, said stored set of information including information indicating communications bands to be used for peer to peer communications at a plurality of different locations. In some such embodiments, the communications device further supports wide area network communications and the set of stored information further includes information indicating communications bands to be used for wide area network communications at a plurality of different locations.

In some embodiments, the stored set of information indicates different frequency bands to be used for peer to peer and wide area network communications at one location. In some embodiments, the stored set of information indicates information that indicates that the same frequency band is to be used for peer to peer and wide area network communications at one location. Thus in some embodiments, different frequency bands at a location may be and sometimes are classified into different usage categories, e.g., for WAN signaling exclusively, for peer to peer signaling exclusively, for both peer to peer and WAN signaling to be used concurrently, e.g., with each type of signaling acting as interference to the other type.

The approach of maintaining, updating and using stored information correlating band usage types information, e.g., information designating bands to be available for peer to peer communications, with location information is beneficial in various embodiments implementing dynamic communications band allocation and/or reallocation, e.g., by a base station, as a function of current and/or estimated cellular and/or peer to peer activities in a region. This approach, including updating a set of location/band association information stored in the wireless terminal, e.g., via network node signaling, is also useful in phased deployment implementations, where the spectrum availability and/or base station capabilities vary over time.

Operation proceeds from step 1608 to step 1610. In step 1610, the communications device transmits a peer to peer signal in the determined communications band.

Figure 17:
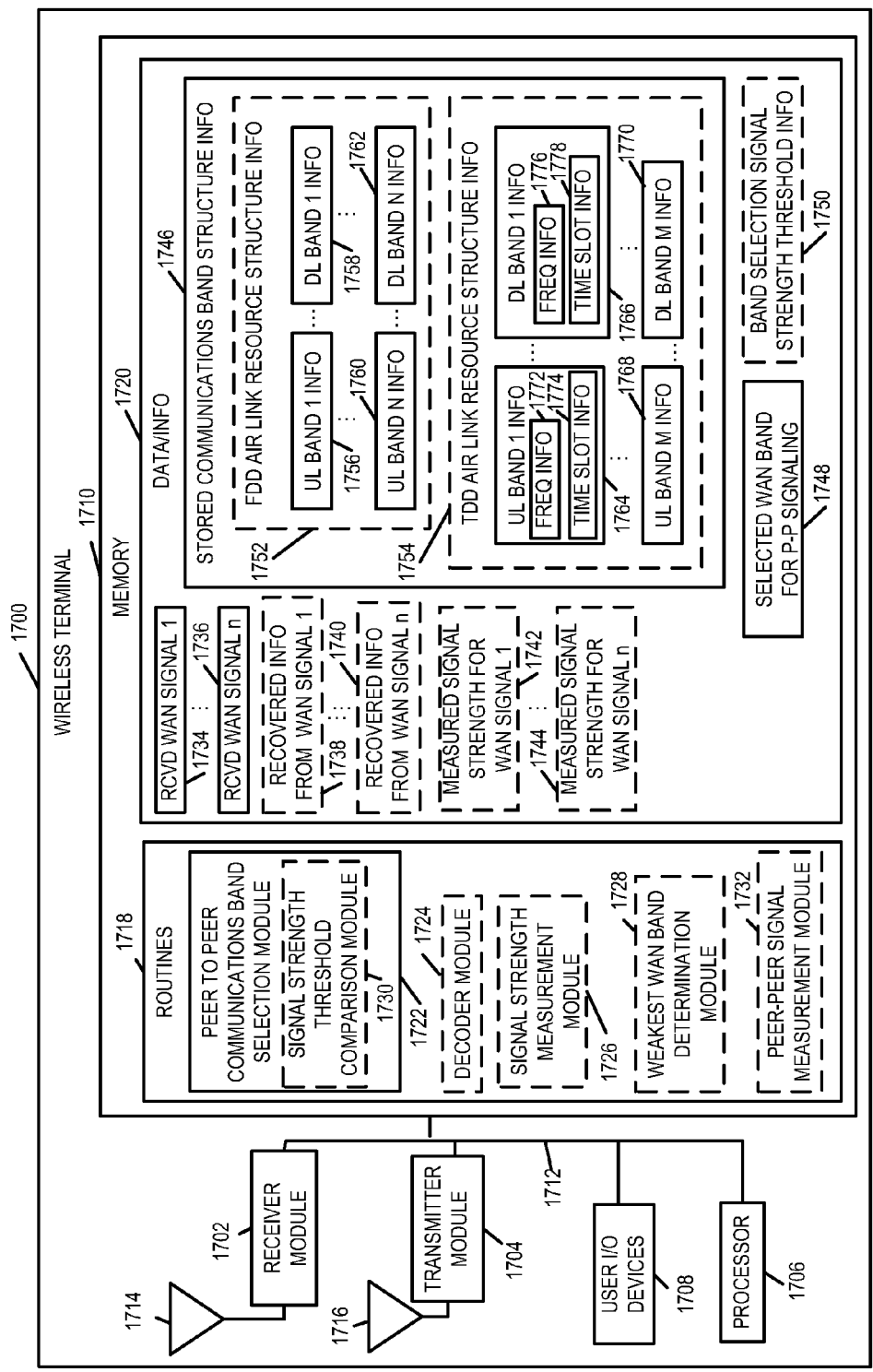
FIG. 17 is a drawing of an exemplary wireless terminal, e.g., a mobile node supporting peer to peer communications, in accordance with various embodiments.

FIG. 17 is a drawing of an exemplary wireless terminal 1700, e.g., a mobile node supporting peer to peer communications, in accordance with various embodiments. Exemplary wireless terminal 1700 includes a receiver module 1702, a transmitter module 1704, a processor 1706, user I/O devices 1708, and a memory 1710 coupled together via a bus 1712 over which the various elements may exchange data and information.

Receiver module 1702, e.g., an OFDM or CDMA wireless receiver, is coupled to receive antenna 1714 via which the wireless terminal 1700 receives signals. Received signals include signals from WAN devices, e.g., a downlink signal from a base station used for peer to peer band selection purposes. Receiver module 1702 receives a signal from a WAN communications device, the signal having been transmitted by the WAN device in one of a plurality of WAN communications bands. Received WAN signals (1734, . . . , 1736) represent such signals. Received signals received by module 1702 also include signals from other peer to peer devices. In some embodiments, received peer to peer signals are also utilized in selecting a peer to peer communications band. Received peer to peer signals also include received peer to peer signals as part of an ongoing peer to peer communications session.

Transmitter module 1704, e.g., an OFDM or CDMA wireless transmitter, is coupled to transmit antenna 1716 via which the wireless terminal 1700 transmits signals, e.g., peer to peer signals to other wireless terminals operating in a peer to peer communications mode of operation. Transmitter module 1704 transmits a peer to peer signal in the selected one of the WAN communications bands which the wireless terminal uses for peer to peer signaling, e.g., the WAN communication band identified by information 1748. In some embodiments, the same antenna is used for both transmitter and receiver. In some embodiments multiple antenna are used for at least one of reception and transmission, e.g., as part of a MIMO configuration.

User I/O devices 1708 include, e.g., microphone, keyboard, keypad, switches, camera, speaker, display, etc. User I/O devices 1708 allow a user of wireless terminal 1700 to input data/information, access output data/information, and control at least some function of the wireless terminal, e.g., initiate a peer to peer communications session.

Memory 1710 includes routines 1718 and data/information 1720. The processor 1706, e.g., a CPU, executes the routines 1718 and uses the data/information 1720 in memory 1710 to control the operation of the wireless terminal 1700 and implement methods, e.g., a method of one of: flowchart 1000 of FIG. 10, flowchart 1100 of FIG. 11, flowchart 1200 of FIG. 12, flowchart 1300 of FIG. 13, and flowchart 1400 of FIG. 14.

Routines 1718 include a peer to peer communications band selection module 1722. Routines 1718 include one or more of decoder module 1724, signal strength measurement module 1726, weakest WAN band determination module 1728 and peer to peer signal strength measurement module 1732.

Data/information 1720 includes a plurality of received WAN signals (received WAN signal 1 1734, . . . , received WAN signal n 1736), stored communications band structure information 1746, and information identifying a selected WAN band for peer to peer signaling 1748. In some embodiments data/information 1720 includes one of more of the following: recovered information from WAN signals (recovered information from WAN signal 1 1738, . . . , recovered information from WAN signal n 1740), measured signal strength information corresponding to received WAN signals (measured signal strength information for WAN signal 1 1742, . . . , measured signal strength information for WAN signal n 1744), and band selection signal strength threshold information 1750.

Stored communications band structure information 1746 includes one or more of: frequency division duplex (FDD) air link resource structure information 1752 and time division duplex (TDD) air link resource structure information 1754. FDD air link resource structure information 1752 includes information corresponding to a plurality of corresponding uplink/downlink band pairs ((uplink band 1 information 1756, downlink band 1 information 1758), . . . (uplink band N information 1760, downlink band N information 1762). TDD air link resource structure information 1754 includes information corresponding to a plurality of corresponding uplink/downlink band pairs (uplink band 1 information 1764, downlink band 1 information 1766), . . . (uplink band M information 1768, downlink band M information 1770). Uplink band 1 information 1764 includes frequency information 1772 and time slot information 1774. Downlink band 1 information 1766 includes frequency information 1776 and time slot information 1778. In some embodiments, the frequency information 1772 is the same as frequency information 1776.

Peer to peer communications band selection module 1722 selects one of a plurality of WAN communications bands based on a received WAN signal. Selected WAN band for peer to peer 1748 identifies the selection of selection module 1722, and is used by wireless terminal 1700 for subsequent peer to peer communications, e.g., for tuning and/or controlling operation of the receiver module 1702 and transmitter module 1704 to support peer to peer signaling.

Decoder module 1724 decodes, prior to selecting one of the WAN frequency bands, a received signal to recover communicated information from the received signal. For example, decoder module 1724 decodes one or more of received WAN signals (1734, . . . , 1736) to obtain recovered communicated information (recovered information from WAN signal 1 1738, . . . , recovered information from WAN signal n 1740). In some such embodiments, the selection module 1722 uses the recovered communicated information to select between a plurality of WAN communications bands. In some such embodiments, the recovered communicated information indicates one of the plurality of frequency bands which is one of i) unused by a sector of the WAN device from which the signal is received and ii) used by the sector of the WAN device from which the signal was received but at a reduced power level in that sector relative to other ones of said plurality of WAN frequency bands. In some embodiments, the WAN device is a single sector base station and the sector is the single sector of the single sector base station.

In some embodiments, the selecting by selection module 1722 includes selecting the WAN communications band indicated by the recovered communicated information.

In some embodiments, the selected communications band selected by the selection module 1722 is different from the band from which the received signal was received. In some exemplary embodiments, the WAN communications bands are FDD communications bands and the communications band from which the WAN signal is received is a WAN downlink communications band. In some such embodiments, the selected communications band to use for peer to peer communications is a WAN uplink communications band.

In some embodiments, the WAN communications bands are TDD communications bands and the WAN communications band from which the WAN signal is received corresponds to a time slot within a downlink communications band. In some such embodiments, the selected communications band, selected by module 1722 to be used for peer to peer communications, is an uplink band and the transmitter module 1704 transmits a generated peer to peer signal in an uplink time slot within said uplink band, the uplink and downlink communications bands using the same frequency but at different times.

Signal strength measurement module 1726 measures the strength of received signals, e.g., the strength of one of more received WAN signals (1734, . . . , 1736). Measured signal strength information (measured signal strength for WAN signal 1 1742, . . . , measured signal strength for WAN signal n 1744) represent outputs of signal strength measurement module 1726 derived from (received WAN signal 1 1734, . . . , received WAN signal n 1736). In some such embodiments, the selection module 1722 performs the selection as a function of measured signal strength information.

In some embodiments, the peer to peer communications band selection module 1722 includes a signal strength threshold comparison module 1730. Signal strength threshold comparison module 1730 uses the data/information 1720 including band selection signal strength threshold information 1750 to compare a measured signal strength to a threshold. In some such embodiments, the selection module 1722 selects a communications band corresponding to the band from which the signal was received when the signal strength is below the threshold, said communications band from which the signal was received being a different communications band from which the signal was received. For example, consider that the received WAN signal 1 1734 was received in a first downlink communications band, that the measured power of received WAN signal 1 1742 was determined to be below a threshold stored in threshold information 1750, and that the first downlink communications band is paired with a first uplink communications band identified in the stored communications band structure information. In one such embodiment, the selection module 1722 selects the first uplink communications band to use for peer to peer communications.

In various embodiments, the signal strength measurement module 1726 is for measuring received signal strengths of WAN communications signals received from different WAN communications bands, and the selection module 1722 selects the communications band as a function of the measured signal strength of at least two different received signals.

Weakest WAN band determination module 1728 determines the WAN band having the weakest one of the measured received WAN signals. In some such embodiments, the selection module 1722 selects the communications band corresponding to the band from which the weakest one of the measured received WAN signals was received. In one exemplary embodiment, the received WAN signals are base station signals from communications downlink bands which are paired with uplink communications bands, and the selection module 1722 selects the uplink communications band which is paired with the downlink communications band from which the weakest received signal was received, to be used for peer to peer communications. In some embodiments, the base stations transmit the same type of WAN signal, e.g., a beacon or pilot channel signal, at the same power level which is detected, measured for receive signal strength, and evaluated with other similar signals to determine the weakest received one.

In some other embodiments, different base stations may, and sometimes do, transmit a WAN to be received, measured, and compared with WAN signals from other base stations at different transmission power levels. Scaling information, known to or supplied to, the wireless terminal 1700 is used by the wireless terminal 1700 to scale measurements of received WAN signals before performing a weakness determination by module 1728. In some embodiments, adjustments are also made to take into account different SNR requirements at a WAN device which will be impacted by the peer to peer signaling.

Peer to peer signal measurement module 1732 measures peer to peer signals received from communications bands corresponding to the communications bands from which at least some of the measured WAN communications signals were received. In some such embodiments, the selection module 1722 selects a corresponding communications band as a function of the measured signal strength of received WAN signals and the measured signal strength of at least some peer to peer signals.

In some embodiments, the signal strength threshold comparison 1730 compares the measured signal strength to a threshold, and the selection module 1722 selects a communications band which does not correspond to the band from which the signal was received when the signal strength is above the threshold. For example, signal strength of a measured WAN base station downlink signal above a certain threshold, in some embodiments, indicates that the peer to peer device is too close to the base station, and allowing peer to peer communications in its corresponding uplink band would unacceptably impact WAN uplink signal recovery by the base station in that uplink band, and therefore peer to peer signaling in that uplink band is restricted. In some embodiments, the signal strength threshold comparison module 1730 is a separate module form selection module 1722.

Stored communications band structure information 1746 indicates a correspondence between uplink and downlink communications bands. In some such embodiments, the receiver module 1702 receives a signal from a WAN base station and the communications band from which the signal is received is a downlink communications band, and the selection module 1722 uses the stored communications band structure information 1746 to select the uplink band corresponding to the downlink communications band to be used as the selected communications band for peer to peer communications. For example, consider that the communications system is a FDD system, that the received WAN signal (1734) is received in the downlink band identified by DL band 1 information 1758 and that the selected communications band selected by selection module 1722 to be used for peer to peer communications is the paired uplink band 1 identified by information 1756. As another example, consider that the communications system is a TDD system, and that the received WAN signal (1734) is received in the downlink communications band identified by DL band 1 information 1766, and that the selected communications band selection by selection module 1722 to be used for peer to peer communications is uplink band 1 identified by information 1764.

In various embodiments, the device from which the WAN signal, e.g., signal 1734, is received is a WAN communications device in a frequency division duplex multi-cell communications system wherein at least one band is not used by a sector of at least one cell at any given time. In some such embodiments, the unused band is available for use for peer to peer communications. Information identifying an unused WAN band available for peer to peer communications is, e.g., extracted from recovered information from WAN signal 1 1738. In some embodiments, in different portions of the system different bands may be unused. In some embodiments, corresponding to the same base station attachment point, a WAN band is designated by the base station for one of: WAN exclusive use, WAN/peer to peer sharing, peer to peer exclusive use. In some embodiments, the designation changes over time, e.g., as a function of system loading. Designation information is, in some embodiments obtained in recovered information from a WAN signal.

In various embodiments, the device from which the WAN signal is received is a WAN communications device in a frequency division duplex multi-cell communication system in which at least one sector of a cell uses multiple communications bands at the same time. In some such embodiments, one of the communications bands is used at a reduced power level relative to another one of the communications bands used in said sector. For example, the sector includes three different downlink/uplink frequency band pairs, each pair associated with a different base station reference power level for downlink signaling.

In some embodiments, the device from which the WAN signal, e.g., received WAN 1 signal 1734, is received is a WAN communications device, e.g., a base station, which uses only a subset of the WAN communications bands in the overall system, the subset including less than the full plurality of WAN communications bands.

In some embodiments, the wireless terminals supports peer to peer communications in both FDD WAN systems and TDD WAN systems, e.g., in one region or range of spectrum, the WAN system in use is a FDD system while in another region or range of spectrum the WAN system in use is a TDD WAN system. In some such embodiments, the wireless terminal 1700 supporting peer to peer communications adapts to accommodate the type of WAN system available.

Figure 18:
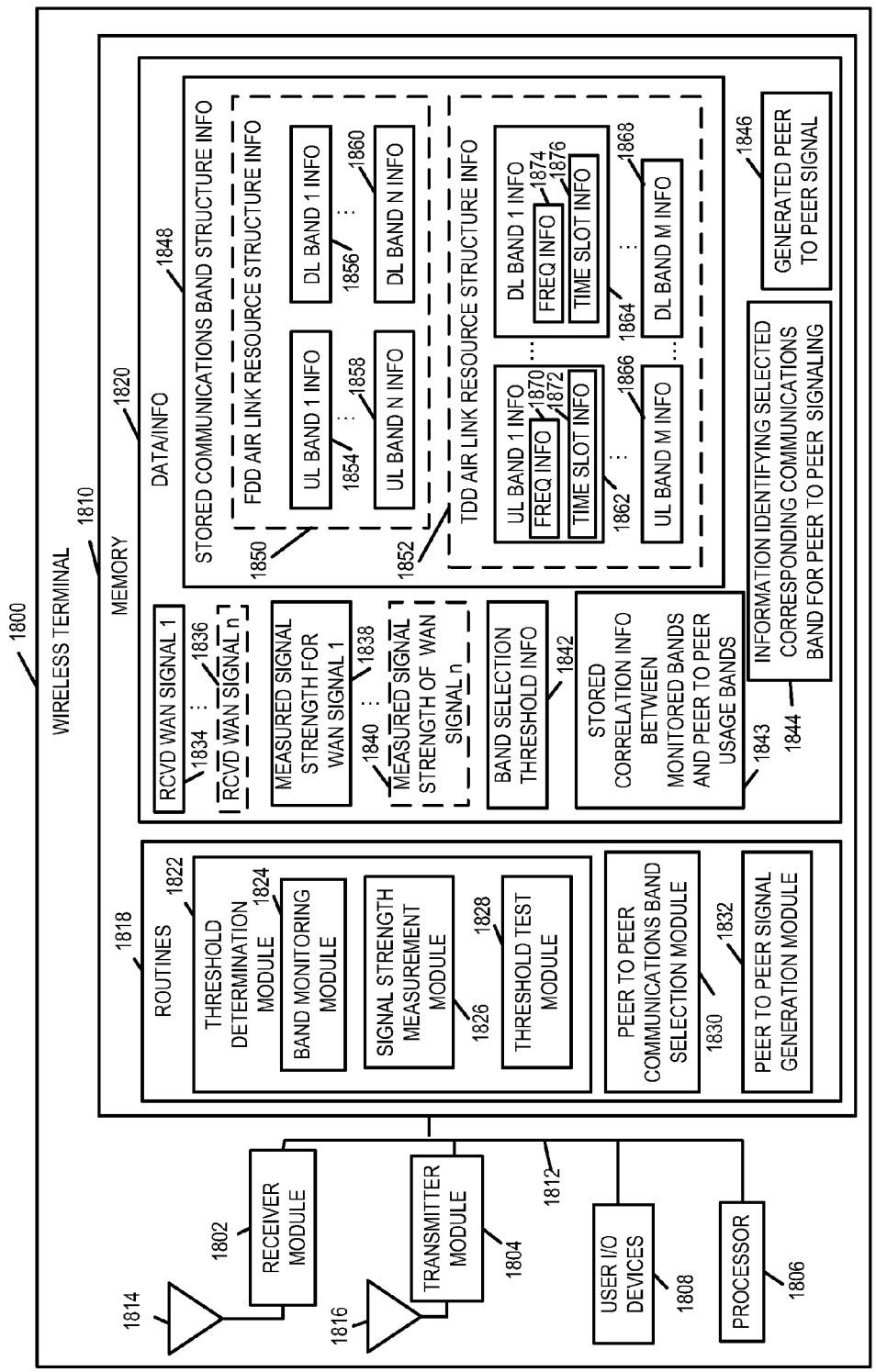
FIG. 18 is a drawing of an exemplary wireless terminal, e.g., a mobile node supporting peer to peer communications, in accordance with various embodiments

FIG. 18 is a drawing of an exemplary wireless terminal 1800, e.g., a mobile node supporting peer to peer communications, in accordance with various embodiments. Exemplary wireless terminal 1800 includes a receiver module 1802, a transmitter module 1804, a processor 1806, user I/O devices 1808, and a memory 1810 coupled together via a bus 1812 over which the various elements may exchange data and information.

Receiver module 1802, e.g., an OFDM or CDMA wireless receiver, is coupled to receive antenna 1814 via which the wireless terminal 1800 receives signals. Receiver module 1802 receives signals from at least one WAN communications band. Received signals include signals from WAN devices, e.g., a downlink signal from a base station used for peer to peer band selection purposes. Receiver module 1802 receives a signal from a WAN communications device, the signal having been transmitted by the WAN device in one of a plurality of WAN communications bands. Received WAN signals (1834, . . . , 1836) represent such signals. Received signals received by module 1802 also include signals from other peer to peer devices. In some embodiments, received peer to peer signals are also utilized in selecting a peer to peer communications band. Received peer to peer signals also include received peer to peer signals as part of an ongoing peer to peer communications session.

Transmitter module 1804, e.g., an OFDM or CDMA wireless transmitter, is coupled to transmit antenna 1816 via which the wireless terminal 1800 transmits signals, e.g., generated peer to peer signals such as signal 1846 to other wireless terminals operating in a peer to peer communications mode of operation. Transmitter module 1804 transmits a peer to peer signal in the selected one of the WAN communications bands which the wireless terminal uses for peer to peer signaling, e.g., the WAN communication band identified by information 1844. In some embodiments, the same antenna is used for both transmitter and receiver. In some embodiments multiple antenna are used for at least one of reception and transmission, e.g., as part of a MIMO configuration.

User I/O devices 1808 include, e.g., microphone, keyboard, keypad, switches, camera, speaker, display, etc. User I/O devices 1808 allow a user of wireless terminal 1800 to input data/information, access output data/information, and control at least some function of the wireless terminal, e.g., initiate a peer to peer communications session.

Memory 1810 includes routines 1818 and data/information 1820. The processor 1806, e.g., a CPU, executes the routines 1818 and uses the data/information 1820 in memory 1810 to control the operation of the wireless terminal 1800 and implement methods, e.g., the method of flowchart 1500 of FIG. 15.

Routines 1818 include a threshold determination module 1822, a peer to peer communications band selection module 1830 and a peer to peer signal generation module 1832. Threshold determination module 1822 includes a band monitoring module 1824, a signal strength measurement module 1826 and a threshold test module 1828.

Data/information 1820 includes one or more received WAN signals (received WAN signal 1 1834, . . . , received WAN signal n 1836), measured signal strength information (measured signal strength for WAN signal 1 1838, . . . , measured signal strength for WAN signal n 1840), band selection threshold information 1842, stored correlation information between monitored bands and peer to peer usage bands 1843, stored communications band structure information 1848, information identifying a selected corresponding communications band for peer to peer signaling 1844, and a generated peer to peer signal 1846.

Stored communications band structure information 1848 includes one or more of FDD air link resource structure information 1850 and TDD air link resource structure information 1852. FDD air link resource structure information 1850 includes structure information for a plurality of uplink/downlink band pairs ((uplink band 1 information 1854, downlink band 1 information 1856), . . . , (uplink band N information 1858, downlink band N information 1860)). TDD air link resource structure information 1852 includes structure information for a plurality of uplink/downlink band pairs ((uplink band 1 information 1862, downlink band 1 information 1864), . . . , (uplink band M information 1866, downlink band M information 1868)). Uplink band 1 information 1862 includes frequency information 1870 and time slot information 1872, while downlink band 1 information 1864 includes frequency information 1874 and time slot information 1876. In some embodiments, for at least some UL/DL band pairs the frequency information is the same, but the time slot information is different, e.g., frequency information 1870 and frequency information 1874 identify the same set of OFDM tones, but time slot information 1872 identifies a first set of time slots while time slot information 1876 identifies a second set of time slots, and the first and second set of time slots are non-overlapping.

Threshold determination module 1822 determines if a signal having a power level over a threshold level is received in a predetermined period of time from a communications band, e.g., a WAN band which is being monitored by the receiver module 1802. In some embodiments, the signal being evaluated for received power level is a particular type of signal or particular designated signal, e.g., a beacon signal or a specific broadcast channel signal.

Peer to peer communications band selection module 1830 selects a corresponding communications band, which corresponds to the monitored communications band, for peer to peer signaling, when the determination module 1822 determines that a signal having a signal power level over the threshold level is not received in the predetermined period of time. Information identifying selected corresponding communications band for peer to peer signaling 1844 is an output of peer to peer communications band selection module 1830, which is used by the transmitter module 1804, e.g., for tuner setting.

Peer to peer signal generation module 1832 generates a peer to peer signal, e.g., generated peer to peer signal 1846, to be transmitted by transmitter module 1804 in the band identified by information 1844.

Stored correlation information between monitored bands and peer to peer usage bands 1843 includes information indicating a corresponding band to be used for peer to peer signals if a measurement of monitored band meets a criteria. For example, a signal monitored in a downlink FDD band is detected and has a received power level below a predetermined threshold, the corresponding band, in some embodiments is a corresponding uplink band, e.g., the monitored band is the band identified by downlink band 1 information 1856 and the corresponding band to be used for peer to peer signaling is uplink band identified by uplink band information 1854. As another example, consider a case where a band is, optionally, used throughout the system, e.g., as a function of system configuration and/or system loading. Wireless terminal 1800 may monitor for a signal in a WAN band, and if the signal is not detected, the wireless terminal may assume that the band is not being currently used for WAN signaling in the region, and may use the same communications band for peer to peer signaling. For example, consider wireless terminal 1800 does not detect the presence of a particular type of signal, e.g., an OFDM beacon signal, being monitored for in a particular downlink FDD band, then the corresponding band selected for peer to peer signaling may be the same band, e.g., the downlink band N identified by information 1860 can be and sometimes is, both the monitored band and the band selected for peer to peer signaling.

In some embodiments, e.g., an embodiment in which some bands are optionally used throughout the system for WAN signaling and are available for peer to peer signaling if unused for WAN signaling, the stored information 1843 indicates that a WAN communications band being monitored for peer to peer threshold determination is the same as a corresponding communications band to be used for peer to peer signaling.

In some embodiments, the stored information 1843 indicates that a WAN communications band being monitored for peer to peer threshold determination is different from a corresponding communications band to be used for peer to peer signaling. In some FDD WAN system embodiments, DL WAN bands of the FDD system are monitored by threshold determination module 1822 and the corresponding uplink band is an UL frequency band. For example, the threshold determination module 1822 monitors one or more of the DL bands identified by information (1856, ..., 1860), and selects a corresponding band to use for peer to peer signaling from uplink bands (1854, ..., 1858). For example, consider that the monitored band which satisfies the test criteria is the band identified by downlink band 1 information 1856, the corresponding uplink band selected by selection module 1830 for peer to peer signaling is the band identified by uplink band 1 information 1854. As another example, consider a TDD system embodiment, DL WAN bands of the TDD system are monitored by threshold determination module 1822 and the corresponding uplink band is an UL frequency band. For example, the threshold determination module 1822 monitors one or more of the DL bands identified by information (1864, ..., 1868), and selects a corresponding band to use for peer to peer signaling from uplink bands (1862, ..., 1866). For example, consider that the monitored band which satisfies the test criteria is the band identified by downlink band 1 information 1864, the corresponding uplink band selected by selection module 1830 for peer to peer signaling is the band identified by uplink band 1 information 1862. In some such TDD embodiments, the corresponding uplink band identified by information 1862 to be used for peer to peer signaling may use the same set of frequencies as the monitored downlink band; however uplink and downlink may map to different non-overlapping time slots.

Band monitoring module 1824 monitors communications bands to detect for the presence or absence of a signal or signals in the communications band. Signal strength measurement module 1826 measures signal strength corresponding to a band being monitored, e.g., obtaining a signal strength corresponding to a particular signal being monitored for. In some embodiments, a null signal strength measurement value indicates that the signal was not detected in the monitored band. Threshold test module 1828 compares a measured signal strength to a threshold level, e.g., a threshold stored in band selection threshold information 1842.

In some embodiments, there are a plurality of communications bands which can be, and sometimes are, monitored, and if a signal detected in a first monitored communication band exceeds a threshold, the threshold determination module 1822 monitors a second communications band out of the plurality of communications bands. For example, the threshold test module 1828 detects a threshold exceeded condition and notifies the band monitoring module 1824 to switch to monitor a different one or the plurality of communications bands. In some such embodiments, the peer to peer communication band selection module 1832 selects one of the plurality of bands other than the first communications band for peer to peer signaling as a function of the monitoring of the second communications band. In some such embodiments, the selection module 1830 selects a communications band in which the threshold detection module 1822 does not detect a signal exceeding the threshold. In some other such embodiments, the selection module 1830 selects a corresponding communications band, which corresponds to a communications band in which the detection module 1822 does not detect a signal exceeding the threshold.

Received WAN signal 1 1834 and received WAN signal n 1836 are received signals which are evaluated by threshold determination module 1822. In some embodiments a received WAN signal, e.g., received WAN signal 1 1834, may be background and/or interference noise present on a monitored set of air link resources, e.g., a set of OFDM tones over a predetermined time interval, with the absence of a specific characteristic signal being present above a predetermined power level being indicative of a band's availability for peer to peer signaling. For example, the band monitoring module 1824 is set to monitor the DL band identified by DL band 1 information 1856 and received WAN signal 1 1834 is obtained; the band monitoring module 1824 is set to monitor the DL band identified by DL band N information 1860 and received WAN signal n 1836 is obtained. (Measured signal strength for WAN signal 1 1838, measured signal strength for WAN signal n 1840) represent outputs from signal strength measurement module 1826 corresponding to signal (1834, 1836), respectively. Band selection threshold information 1842 includes limits, e.g., predetermined limits, used by threshold test module 1828 in determining whether the measured received signal level is such to allow or restrict peer to peer communications in a corresponding band.

Figure 19:
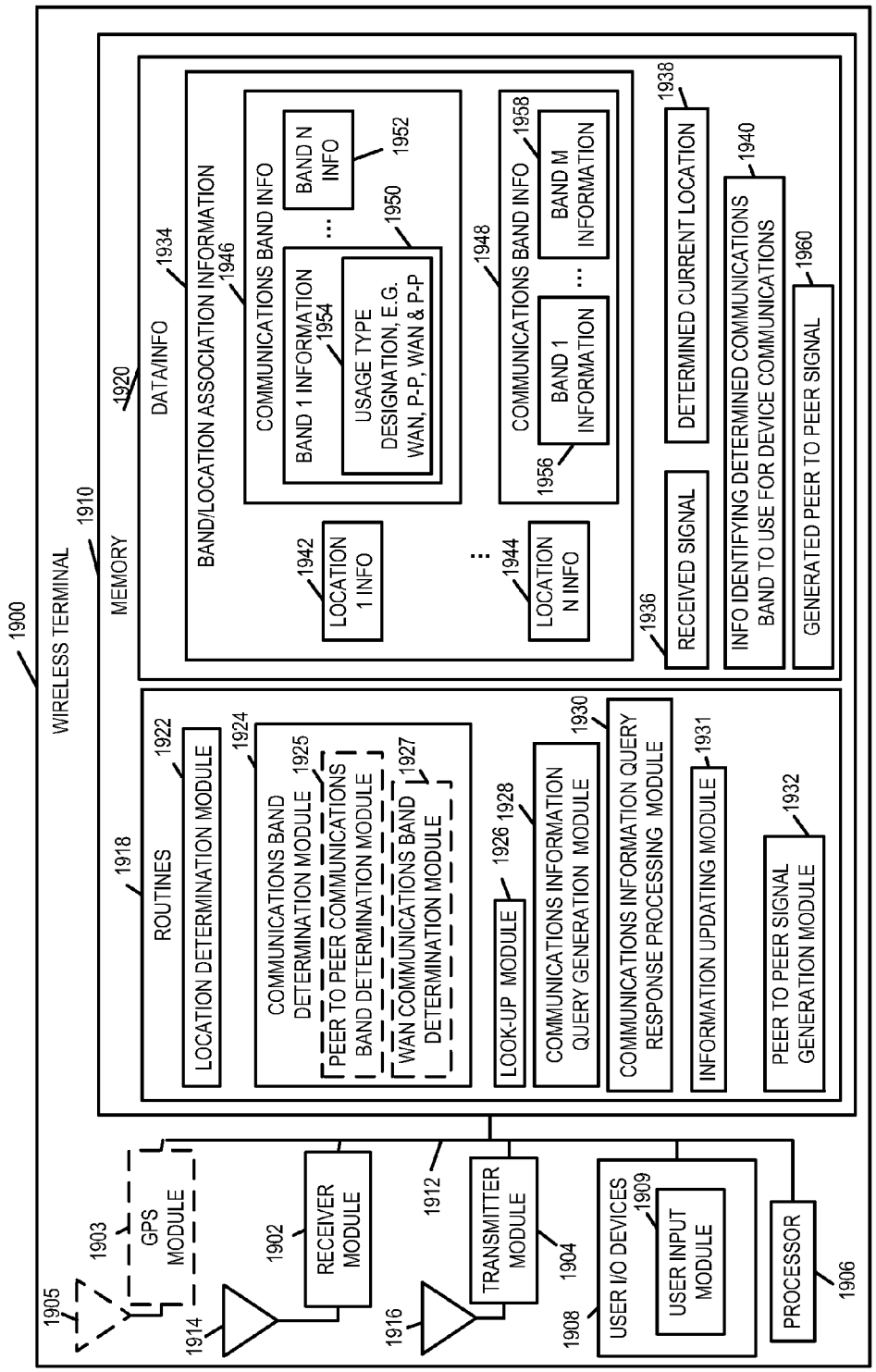
FIG. 19 is a drawing of an exemplary wireless terminal, e.g., a mobile node supporting peer to peer communications, in accordance with various embodiments.

FIG. 19 is a drawing of an exemplary wireless terminal 1900, e.g., a mobile node supporting peer to peer communications, in accordance with various embodiments. Exemplary wireless terminal 1900 includes a receiver module 1902, a transmitter module 1904, a processor 1906, user I/O devices 1908, and a memory 1910 coupled together via a bus 1912 over which the various elements may exchange data and information.

Receiver module 1902, e.g., an OFDM or CDMA wireless receiver, is coupled to receive antenna 1914 via which the wireless terminal 1900 receives signals. Received signals include peer to peer communications signals and/or WAN downlink signals. In some embodiments, received signals include communications information query response signals.

Transmitter module 1904, e.g., an OFDM or CDMA wireless transmitter, is coupled to transmit antenna 1916 via which the wireless terminal 1900 transmits signals, e.g., generated peer to peer signals such as signal 1960, to other wireless terminals operating in a peer to peer communications mode of operation. Transmitted signals also include WAN uplink signals directed to a base station. Transmitter module 1904, in some embodiments, also transmits queries generated by communications information query generation module 1928 over a wireless communications link, said query being directed to a network device.

In some embodiments, the same antenna is used for both transmitter module 1904 and receiver module 1902. In some embodiments multiple antenna are used for at least one of reception and transmission, e.g., as part of a MIMO configuration.

In some embodiments, wireless terminal 1900 includes GPS module 1903, which is also coupled to bus 1912. In such an embodiment, the GPS module 1903, e.g., a GPS receiver module, is coupled to GPS antenna 1905 via which the GPS module 1903 receives GPS signals from GPS satellites, the received GPS signals being utilized by GPS module 1903 to obtain a position fix information of wireless terminal 1900. In various embodiments, the GPS module 1903 is included as part of the location determination module 1922.

User I/O devices 1908 include, e.g., microphone, keyboard, keypad, switches, camera, speaker, display, etc. User I/O devices 1908 allow a user of wireless terminal 1900 to input data/information, access output data/information, and control at least some function of the wireless terminal, e.g., initiate a peer to peer communications session. In some embodiments, the user of wireless terminal 1900 may, and sometimes does enter an approximate location of the wireless terminal 1900, which is utilized by the location determination module 1922 in determining a location, e.g., determining a more precise location in a shorter time than would otherwise be required. In some such embodiments, the entered location is used for initialization purposes by the GPS module 1903.

User I/O devices 1908 include a user input module 1909. User input module 1909 generates a signal from user input which is used by the location determination module 1922, e.g., the user may enter a street address, intersection, landsite, highway, zip code, etc. and the user input module generates and communicates such information in a signal to the location determination module.

Memory 1910 includes routines 1918 and data/information 1920. The processor 1906, e.g., a CPU, executes the routines 1918 and uses the data/information 1920 in memory 1910 to control the operation of the wireless terminal 1900 and implement methods, e.g., the method of flowchart 1600 of FIG. 16.

Routines 1918 include a location determination module 1922, a communications band determination module 1924, a look-up module 1926, a communications information query generation module 1928, a communications information query response processing module 1930, an information updating module 1931 and a peer to peer signal generation module 1932.

Data/information 1920 includes band/location association information 1934, a received signal 1936, a determined current location 1938, information identifying a determined communications band to use for device communications 1940 and a generated peer to peer signal 1960. Band/location association information 1934 includes a plurality of sets of location information matched with communications band information ((location 1 information 1942, communications band information 1946), (location N information 1944, communications band information 1948)). Communications band information 1946 includes one or more sets of band information (band 1 information 1950, ..., band N information 1952). Each set of band information includes usage designation information, e.g., information identifying whether the band is used for WAN signaling exclusively, P-P signaling exclusively, or shared to be used concurrently by both WAN and peer to peer signaling. Band 1 information 1950 includes usage type designation information 1954. Communications band information 1948 includes one or more sets of band information (band 1 information 1956, ..., band M information 1958).

In some embodiments, at least some of the usage type information indicates that the designation of usage for a band changes over time, e.g., in accordance with a predetermined schedule. For example, in one exemplary embodiment, one base station sector may support a plurality of bands associated with different carriers and during time intervals where a high level of WAN signaling is anticipated each of the carriers are dedicated to exclusive WAN signaling; however, during intervals of anticipated intermediate levels of WAN activity at least one of the carriers is associated with shared concurrent WAN and peer to peer signaling. In some such embodiments, during intervals of anticipated low levels of WAN signaling activity, at least one of the carriers is associated with exclusive use for peer to peer signaling.

Location determination module 1922 determines from a received signal a current location of the wireless terminal 1900. For example, from received signal 1936 the location determination module 1922 determines determined current location 1938. The received signal 1936 can be and sometimes is a GPS signal or a signal derived from a processed received GPS signal. The received signal 1936 can be, and sometimes is, a signal from user input module 1909. The received signal 1936 can be, and sometimes is a cellular network signal, e.g., a cellular network signal conveying base station derived location information being communicated via receiver module 1902 to wireless terminal 1900.

Communications band determination module 1924 determines, based on determined location information, a communications band or bands to be used for device communications. Communications band determination module 1924 includes, in some embodiments, a peer to peer communications band determination module 1925 and a WAN communications band determination module 1927. Peer to peer communications band determination module 1925 determines a communications band to be used at the current location for peer to peer communications. WAN communications band determination module 1927 determines a communications band to be used at the current location for WAN communications. In some embodiments different communications bands are determined to be used for peer to peer and WAN communications at a determined current location, for at least some locations.

Look-up module 1926 performs a look-up operation using the current location of the wireless terminal 1900 to identify a communications band in the stored information associated with the current location. For example, the location determination module 1922 may determine determined current location 1938 which is used by look-up module 1926, which associates the determined current location 1938 with one of the stored sets of location information (location 1 information 1942, ... location N information 1944), and then determines the corresponding band information associated with that location. For example, consider that the determined current location maps to location N information 1944, then the communications band information 1948 is utilized by look-up module 1926 to find a band for the device to use. In some such embodiments, the type of device usage, e.g., peer to peer communications is a further input utilized by look-up module 1926 to identify a band.

Peer to peer signal generation module 1932 generates a peer to peer signal, e.g., signal 1960, to be transmitted by transmitter module 1904 in an identified communications band designated to be used at the current location for peer to peer communications.

Communications information query generation module 1928 generates a communications information query to a network device, e.g., a base station, central control node, controller node, band allocation control node, system load balancing node, or communications system wireless terminal tracking node, said query including the current location of the wireless terminal.

Communications query response processing module 1930 recovers information from a received response from a network device. The recovered information is used by the communications band determination module 1924 to determine a communications band associated with the current location. In some embodiments, the recovered information identifies one or more bands to be used for peer to peer signaling. In some embodiments, the recovered information identifies one or more bands to be used for both peer to peer signaling and WAN signaling concurrently. In some embodiments, the recovered information identifies one or more bands to be used for peer to peer signaling exclusively. In some embodiments, the recovered information identifies one or more bands to be used for WAN signaling exclusively.

Information updating module 1931 updates a stored set of information, e.g., band/location association information 1934 to include information indicating the current location and the communications band or bands associated with the current location determined from the query response.

Band/location association information 1934 includes information associating locations with communications bands, at least some of the locations being associated with different communications bands. Wireless terminal 1900 supports peer to peer signaling, and the band/location association information 1934 includes information indicating communications bands to be used for peer to peer communications at a plurality of locations. Wireless terminal 1900 supports wide area network (WAN) signaling, and the band/location association information 1934 includes information indicating communications bands to be used for WAN communications at a plurality of locations. In some embodiments, the stored information 1934 indicates different frequency bands to be used for peer to peer and wide area network communications at at least one location. In some embodiments, the stored information 1934 indicates that the same frequency band is to be used for peer to peer and wide area network communications at at least one location.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, receiving a WAN signal, selecting a WAN communications band to use for peer to peer signaling based on the received WAN signal, identifying from stored information a corresponding uplink band associated with a downlink band, monitoring for the absence of a WAN signal above a predetermined threshold in a WAN communications band, determining to use a WAN band for peer to peer signaling as a function of a received power measurement comparison to a threshold, performing a location determination, performing a communications band determination, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a communications device, comprising:

receiving a reference signal from a wide area network (WAN) device, said reference signal having been transmitted by the WAN device in one of a plurality of WAN communications bands;

measuring a strength of the received reference signal from the WAN device; and selecting one of said WAN communications bands for peer to peer communications as a function of the strength of the received reference signal from the WAN device wherein the selecting comprises:

comparing the measured signal strength of the received reference signal from the WAN device to a threshold, and selecting a communications band according to the comparison.

2. The method of claim 1, further comprising:

transmitting a peer to peer signal in the selected one of said WAN communications bands.

3. The method of claim 2, further comprising, prior to selecting one of said WAN communications bands:

decoding said received reference signal to recover communicated information from said received reference signal; and where said selecting includes using said information to select between said plurality of WAN communications bands.

4. The method of claim 3, wherein said information indicates one of the plurality of communications bands which is one of i) unused by a sector of the WAN device from which said signal is received and ii) used by the sector of the WAN device from which the signal was received but at a reduced power level in said sector relative to the other ones of said plurality of WAN communications bands.

5. The method of claim 4, wherein said WAN device is a single sector base station and wherein said sector is the single sector of said single sector base station.

6. The method of claim 4, wherein said selecting includes selecting the WAN communications band indicated by said information.

7. The method of claim 3, wherein the selected communications band is different from the band from which the received reference signal was received.

8. The method of claim 2, wherein the WAN communications bands are FDD communications bands; and wherein the communications band from which the WAN signal is received is a WAN downlink communications band.

9. The method of claim 8, wherein the selected communications band is a WAN uplink communications band.

10. The method of claim 2, wherein the WAN communications bands are TDD communications bands and wherein the WAN communications band from which said reference signal is received corresponds to a time slot within a downlink communications band.

11. The method of claim 10, wherein the selected communications band is an uplink band and wherein said peer to peer signal is communicated in an uplink time slot within said uplink band, the uplink and downlink communications bands using the same frequency but at different times.

12. The method of claim 2, further comprising:
measuring received reference signal strength of WAN communications signals received from different WAN communications bands, and wherein selecting includes selecting the communications band as a function of the measured signal strength of at least two different received signals.

13. The method of claim 12, wherein said selecting includes selecting the communications band corresponding to the band from which the weakest one of said measured received WAN signals was received.

14. The method of claim 12, further comprising:
measuring peer to peer signals received from communications bands corresponding to the communications bands from which at least some of said measured WAN communications signals were received; and
wherein the said step of selecting a corresponding frequency band is performed as a function of the measured signal strength of said received WAN signals and the measured signal strength of at least some peer to peer signals.

15. The method of claim 2, wherein the device from which the WAN signal is received is a WAN communications device in a frequency division duplex multi-cell communications system wherein at least one band is not used by a sector of at least one cell at any given time.

16. The method of claim 2, wherein the device from which the WAN signal is received is a WAN communications device in a frequency division duplex multi-cell communications system wherein in at least one sector of a cell which uses multiple communications bands at the same time, one of the communications bands is used at a reduced power level relative to another one of the communications bands used in said sector.

17. The method of claim 2, wherein the device from which the WAN signal is received is a WAN communications device which uses only a subset of said WAN communications bands, said subset including less than the full plurality of WAN communications bands.

18. The method of claim 1, wherein said selecting includes:
selecting the communications band corresponding to the band from which said reference signal was received when said reference signal strength is below said threshold, said communications band corresponding to the band from which said signal was received being a different communications band from the band from which the reference signal was received.

19. The method of claim 1, wherein the received reference signal is from a WAN base station and said communications band from which the signal is received is a downlink communications band, and
wherein the selected communications band is an uplink band corresponding to said downlink communications band.

20. The method of claim 1, wherein said selecting includes:
selecting the communications band from the plurality of WAN communications bands which does not correspond to the band from which said reference signal was received when said reference signal strength is above said threshold.

21. A wireless terminal, comprising:
a receiver for receiving a reference signal from a wide area network (WAN) device, said reference signal having been transmitted by the WAN device in one of a plurality of WAN communications bands;
a signal strength measurement module for measuring a strength of the received reference signal from the WAN device; and
a peer to peer communications band selection module for selecting one of said WAN communications bands for peer to peer communications as a function of the strength of the received reference signal from the WAN device,
wherein the peer to peer communications band selection module is configured to:
compare the measured signal strength of the received reference signal from the WAN device to a threshold, and
select a communications band according to the comparison.

22. The wireless terminal of claim 21, further comprising:
a transmitter module for transmitting a peer to peer signal in the selected one of said WAN communications bands.

23. The wireless terminal of claim 22, further comprising,
a decoder module for decoding, prior to selecting one of said WAN communications bands, said received reference signal to recover communicated information from said received reference signal; and
wherein said selection module uses said recovered communicated information to select between said plurality of WAN communications bands.

24. The wireless terminal of claim 23, wherein said information indicates one of the plurality of frequency bands which is one of i) unused by a sector of the WAN device from which said reference signal is received and ii) used by the sector of the WAN device from which the signal was received but at a reduced power level in said sector relative to the other ones of said plurality of WAN communications bands.

25. The wireless terminal of claim 24, wherein said WAN device is a single sector base station and wherein said sector is the single sector of said single sector base station.

26. The wireless terminal of claim 24, wherein said selecting includes selecting the WAN communications band indicated by said information.

27. The wireless terminal of claim 23, wherein the selected communications band is different from the band from which the received reference signal was received.

28. The wireless terminal of claim 22, wherein the WAN communications bands are FDD communications bands; and wherein the communications band from which the WAN signal is received is a WAN downlink communications band.

29. The wireless terminal of claim 28, wherein the selected communications band is a WAN uplink communications band.

30. The wireless terminal of claim 22, wherein the WAN communications bands are TDD communications bands and wherein the WAN communications band from which said signal is received corresponds to a time slot within a downlink communications band.

31. The wireless terminal of claim 30, wherein the selected communications band is an uplink band and wherein said transmitter transmits said peer to peer signal in an uplink time slot within said uplink band, the uplink and downlink communications bands using the same frequency but at different times.

32. The wireless terminal of claim 22, further comprising:
a signal strength measurement module for measuring received reference signal strength of WAN communications signals received from different WAN communications bands, and
wherein said selection module selects the communications band as a function of the measured signal strength of at least two different received signals.

33. The wireless terminal of claim 32, further comprising:
a weakest WAN signal band determination module for determining the WAN band having the weakest one of said measured received WAN signals; and
wherein said selection module selects the communications band corresponding to the band from which the weakest one of said measured received WAN signals was received.

34. The wireless terminal of claim 32, further comprising:
a peer to peer signal measurement module for measuring peer to peer signals received from communications bands corresponding to the communications bands from which at least some of said measured WAN communications signals were received; and
wherein said selection module selects a corresponding frequency band as a function of the measured signal strength of said received WAN signals and the measured signal strength of at least some peer to peer signals.

35. The wireless terminal of claim of claim 22, wherein the device from which the WAN signal is received is a WAN communications device in a frequency division duplex multi-cell communications system wherein at least one band is not used by a sector of at least one cell at any given time.

36. The wireless terminal of claim 22, wherein the device from which the WAN signal is received is a WAN communications device in a frequency division duplex multi-cell communications system wherein in at least one sector of a cell which uses multiple communications bands at the same time, one of the communications bands is used at a reduced power level relative to another one of the communications bands used in said sector.

37. The wireless terminal of claim 22, wherein the device from which the WAN signal is received is a WAN communications device which uses only a subset of said WAN communications bands, said subset including less than the full plurality of WAN communications bands.

38. The wireless terminal of claim 21,
wherein said selection module selects the communications band corresponding to the band from which said signal was received when said reference signal strength is below said threshold, said communications band corresponding to the band from which said reference signal was received being a different communications band from the band from which the signal was received.

39. The wireless terminal of claim 21, further comprising:
memory including stored communications band structure information indicating a correspondence between at least one uplink and downlink WAN communications band;
wherein the receiver module receives a signal from a WAN base station and said communications band from which the signal is received is a downlink communications band, and
wherein the selection module uses said stored communication band structure information to select an uplink band corresponding to said downlink communications band to be used as said selected communications band.

40. The wireless terminal of claim 21,
wherein said selection module selects the communications band from the plurality of WAN communications bands which does not correspond to the band from which said reference signal was received when said signal strength is above said threshold.

41. A wireless terminal, comprising:
receiver means for receiving a reference signal from a wide area network (WAN) device, said reference signal having been transmitted by the WAN device in one of a plurality of WAN communications bands;
means for measuring a strength of the received reference signal from the WAN device; and
means for selecting one of said WAN communications bands for peer to peer communications as a function of the strength of the received reference signal from the WAN device:
wherein the means for selecting is configured to:
compare the measured signal strength of the received reference signal from the WAN device to a threshold, and
select a communications band according to the comparison.

42. The wireless terminal of claim 41, further comprising:
means for transmitting a peer to peer signal in the selected one of said WAN communications bands.

43. The wireless terminal of claim 42, further comprising,
means for decoding, prior to selecting one of said WAN communications bands, said received reference signal to recover communicated information from said received reference signal; and
wherein said means for selecting uses said recovered communicated information to select between said plurality of WAN communications bands.

44. The wireless terminal of claim 42, further comprising:
means for measuring received signal strength of WAN communications signals received from different WAN communications bands, and
wherein said means for selecting selects the communications band as a function of the measured signal strength of at least two different received signals.

45. A non-transitory computer readable medium embodying machine executable instructions for controlling a communications device to implement a method of communicating with another device, the method comprising:
receiving a reference signal from a wide area network (WAN) device, said reference signal having been transmitted by the WAN device in one of a plurality of WAN communications bands;
measuring a strength of the received reference signal from the WAN device; and
selecting one of said WAN communications bands for peer to peer communications as a function of the strength of the received reference signal from the WAN device:

wherein the selecting comprises:
comparing the measured signal strength of the received reference signal from the WAN device to a threshold, and
selecting a communications band according to the comparison.

46. The non-transitory computer readable medium of claim 45, further embodying machine executable instructions for:
transmitting a peer to peer signal in the selected one of said WAN communications bands.

47. The non-transitory computer readable medium of claim 46, further embodying machine executable instructions for, prior to selecting one of said WAN communications bands:
decoding said received reference signal to recover communicated information from said reference received signal; and
where said selecting includes using said information to select between said plurality of WAN communications bands.

48. The non-transitory computer readable medium of claim 46, further embodying machine executable instructions for:
measuring received signal strength of WAN communications signals received from different WAN communications bands, and wherein selecting includes selecting the communications band as a function of the measured signal strength of at least two different received signals.

49. An apparatus comprising:
a processor configured to:
receive a reference signal from a wide area network (WAN) device, said reference signal having been transmitted by the WAN device in one of a plurality of WAN communications bands;
measuring a strength of the received reference signal from the WAN device; and
select one of said WAN communications bands for peer to peer communications as a function of the strength of the received reference signal from the WAN device:
wherein the processor configured to select is further configured to:
compare the measured signal strength of the received reference signal from the WAN device to a threshold, and
select a communications band according to the comparison.

50. The apparatus of claim 49, wherein said processor is further configured to:
transmit a peer to peer signal in the selected one of said WAN communications bands.

51. The apparatus of claim 50, wherein said processor is further configured to, prior to selecting one of said WAN communications bands:
decode said received reference signal to recover communicated information from said received reference signal; and
where said selecting includes using said information to select between said plurality of WAN communications bands.

52. The apparatus of claim 50, wherein said processor is further configured to:
measure received signal strength of WAN communications signals received from different WAN communications bands, and wherein selecting includes selecting the communications band as a function of the measured signal strength of at least two different received signals.

* * * * *